(12) United States Patent
Ge et al.

(10) Patent No.: US 9,521,675 B2
(45) Date of Patent: Dec. 13, 2016

(54) OPPORTUNISTICALLY UTILIZING MEDIA RESOURCES

(71) Applicant: QUALCOMM Incorporated, San Diego, CA (US)

(72) Inventors: Feng Ge, Highland Park, NJ (US); Junyi Li, Chester, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/107,178

(22) Filed: Dec. 16, 2013

(65) Prior Publication Data
US 2015/0173060 A1 Jun. 18, 2015

(51) Int. Cl.
H04W 72/04 (2009.01)
H04W 4/00 (2009.01)
H04W 72/02 (2009.01)
H04W 40/20 (2009.01)
H04W 40/16 (2009.01)
H04W 72/08 (2009.01)

(52) U.S. Cl.
CPC ........... *H04W 72/048* (2013.01); *H04W 4/005* (2013.01); *H04W 40/16* (2013.01); *H04W 40/20* (2013.01); *H04W 72/02* (2013.01); *H04W 72/04* (2013.01); *H04W 72/082* (2013.01)

(58) Field of Classification Search
CPC ............................ H04W 72/02; H04W 72/082
See application file for complete search history.

(56) References Cited

U.S. PATENT DOCUMENTS

2012/0051315 A1* 3/2012 Wang et al. ................. 370/329
2012/0252481 A1 10/2012 Anpat et al.
(Continued)

FOREIGN PATENT DOCUMENTS

| GB | 2493920 A | 2/2013 |
| WO | WO 2013027020 A1 | 2/2013 |
| WO | WO-2013077235 A1 | 5/2013 |

OTHER PUBLICATIONS

ISA/EPO, International Search Report and Written Opinion of the International Searching Authority, Int'l. App. No. PCT/US2014/068561, Mar. 16, 2015, European Patent Office, Rijswijk, NL, 9 pgs.
(Continued)

Primary Examiner — Pao Sinkantarakorn
(74) Attorney, Agent, or Firm — Holland & Hart LLP

(57) ABSTRACT

Methods, systems, and devices are described for improving communications of a machine type communications (MTC) device. In a method of communication, a signal to interference noise ratio (SINR) of one or more resource blocks (RBs) of a target device may be estimated by, for example, an MTC device. The MTC device may then select one or more of the RBs of the target device to be in a resource pool based at least in part on the estimated SINR. In some embodiments, the MTC device may compare the estimated SINR of the one or more RBs of the target device to a threshold SINR and select one or more RBs with an SINR less than the threshold SINR to be in the resource pool. In some embodiments, the MTC device may randomly select a resource block from the resource pool and transmit on the selected resource block.

28 Claims, 13 Drawing Sheets

(56) References Cited

U.S. PATENT DOCUMENTS

2013/0016666 A1    1/2013   Chen et al.
2013/0114533 A1    5/2013   Ji et al.
2014/0171062 A1*   6/2014   Fallgren et al. ........... 455/422.1
2014/0307642 A1*  10/2014   Wanstedt et al. ............ 370/329
2015/0117239 A1*   4/2015   Lindoff et al. ............... 370/252

OTHER PUBLICATIONS

Lien et al., "Radio Resource Management for QoS Guarantees in Cyber-Physical Systems," IEEE Transactions on Parallel and Distributed Systems, Sep. 2012, pp. 1752-1761, vol. 23, No. 9, XP11454808, Institute of Electrical and Electronics Engineers.

Lien et al., "Toward Ubiquitous Massive Accesses in 3GPP Machine-to-Machine Communications," IEEE Communications Magazine, Apr. 2011, pp. 66-74, vol. 49, Iss. 4, XP11478245, Institute of Electrical and Electronics Engineers.

Zheng et al., "Radio Resource Allocation in LTE-Advanced Cellular Networks with M2M Communications," IEEE Communications Magazine, Jul. 2012, pp. 184-192, vol. 50, Iss. 7, XP11478275, Institute of Electrical and Electronics Engineers.

IPEA/EPO, Second Written Opinion of the International Preliminary Examining Authority, Int'l. App. No. PCT/US2014/068561, Nov. 9, 2015, European Patent Office, Rijswijk, NL, 10 pgs.

* cited by examiner

OPPORTUNISTICALLY UTILIZING MEDIA RESOURCES

BACKGROUND

The following relates generally to wireless communication, and more specifically to improving uplink communications for Machine-to-Machine (M2M) communication or Machine Type Communication (MTC) devices. M2M or MTC refers to data communication technologies that allow automated devices to communicate with one another without human intervention. For example, M2M and/or MTC may refer to communications from devices that integrate sensors or meters to measure or capture information and relay that information to a central server or application program that can make use of the information or present the information to humans interacting with the program or application. These devices may be called M2M devices, MTC devices and/or MTC user equipments (UEs).

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, transaction-based business charging, etc. The market for MTC devices is expected to grow rapidly as industries such as automotive, security, healthcare, and fleet management employ MTC to increase productivity, manage costs, and/or expand customer services.

MTC devices may use a variety of wired and/or wireless communication technologies. For example, MTC devices may communicate with a network over various wireless cellular technologies, such as Long Term Evolution (LTE) and/or various wireless networking technologies (e.g., IEEE 802.11 (Wi-Fi), IEEE 802.16 (WiMAX), etc.). MTC devices may also communicate with one another using various peer-to-peer technologies such as LTE-Direct (LTE-D), Bluetooth, ZigBee, and/or other ad-hoc or mesh network technologies. The expansion of multiple access wireless networks around the world has made it far easier for MTC communication to take place and has lessened the amount of power and time necessary for information to be communicated between machines.

MTC devices may use a narrow frequency band transceiver. As a result, MTC devices may have link budget challenges, particularly for uplink communications to a base station or eNB, for example. Furthermore, MTC devices are generally power efficient and low-cost. As a result, MTC devices are usually equipped with a small power amplifier (PA), or no PA at all, which may further limit uplink communications of MTC devices to only nearby base stations or eNBs.

SUMMARY

The described features generally relate to one or more improved systems, methods, and/or apparatuses for improving uplink communications of an MTC device. Uplink communications may be improved by opportunistically utilizing media resources of a target device, such as a mobile device or user equipment (UE). Via the described techniques, an MTC device may transmit data to a base station using resources assigned to one or more target devices. In one embodiment, the MTC device may be within communication range of the base station and may transmit data directly to the base station on resources assigned to the one or more target devices. In another embodiment, the MTC device may not be within range of the base station and may transmit data first to a relay node using resources assigned to one or more target devices to then be transmitted to the base station.

In some embodiments, the MTC device may estimate a signal to interference plus noise ratio (SINR) on one or more resources, such as one or more resource blocks (RBs) of one or more target devices. The MTC device may then select one or more RBs of the one or more target devices to be in a resource pool based on the estimated SINR of each RB. In some embodiments, the MTC device may select an RB with an SINR less than a threshold value to be allocated to a resource pool of the MTC device. By specifying the threshold value to be relatively small, the interference of the MTC device to one or more target devices within a range of the MTC device may be minimized. The MTC device may then communicate a signal over one or more RBs in the resource pool, for example to a relay node and/or a base station.

In some embodiments, a method of communication may include estimating, by a MTC device, a SINR of one or more RBs of one or more target devices. The method of communication may also include the MTC device selecting one or more of the RBs of the one or more target devices to be in a first resource pool based at least in part on the estimated SINR and communicating a signal over one or more RBs in the first resource pool. In some cases, the one or more target devices may be a user equipment (UE) engaged in autonomous discovery.

In some embodiments, the MTC device may also compare the estimated SINR of the one or more RBs of the one or more target devices to a threshold SINR and select one or more of the RBs of the one or more target devices to be in the first resource pool with an SINR less than the threshold SINR.

The MTC device may randomly select a RB from the first resource pool, and transmit on the selected resource block. In some cases, the MTC device may determine a hopping pattern used by the one or more target devices and hop the selected RB based on the determined hopping pattern used by the one or more target device.

In some embodiments, the MTC device may estimate a distance between the MTC device and the one or more target devices and select a relay device from the one or more target devices based at least in part on the estimated distance(s). The MTC device may estimate its own signal's SINR on the one or more RBs of the selected relay device. The MTC device may then select one or more of the RBs of the relay device to be in a second resource pool, with the estimated SINR of the MTC signal on those RBs of the relay device above a threshold. The MTC device may then communicate a signal over one or more RBs in both the first resource pool and the second resource pool to the relay device.

In other embodiments, a MTC device may include a processor, a memory in electronic communication with the processor, and instructions stored in the memory, the instructions being executable by the processor to estimate a SINR of one or more RBs of one or more target devices. The instructions executable by the processor may also enable the MTC device to select one or more of the RBs of the one or more target devices to be in a first resource pool based at least in part on the estimated SINR, and communicate a signal over one or more RBs in the first resource pool. In some cases, the one or more target devices may be a user equipment (UE) engaged in autonomous discovery.

In some embodiments, the instructions executable by the processor may also enable the MTC device to compare the estimated SINR of the one or more RBs of the one or more target devices to a threshold SINR, and select one or more of the RBs of the one or more target devices to be in the first resource pool with an SINR less than the threshold SINR.

In some embodiments, the instructions executable by the processor may also enable the MTC device to randomly select a RB from the first resource pool, and transmit on the selected resource block. In some cases, the instructions executable by the processor may further enable the MTC device to determine a hopping pattern used by the one or more target devices, and hop the selected RB based on the determined hopping pattern used by the one or more target device.

In some embodiments, the instructions executable by the processor may also enable the MTC device to estimate a distance between the MTC device and the one or more target devices and select a relay device from the one or more target devices based at least in part on the estimated distance(s). The instructions executable by the processor may also enable the MTC device to measure a signal strength of the one or more RBs of the one or more target devices, and estimate the distance between the MTC device and the one or more target devices based at least in part on the measured signal strength. The MTC device, via instructions executable by the processor, may then estimate SINR of the MTC device on the one or more RBs of the relay device, and select one or more of the RBs of the relay device to be in a second resource pool based at least in part on the estimated SINR. The MTC device, also via instructions executable by the processor, may then communicate a signal over one or more RBs in both the first resource pool and the second resource pool to the relay device.

In other embodiments, a MTC device may include means for estimating a SINR of one or more RBs of one or more target devices, means for selecting one or more of the RBs of the one or more target devices to be in a first resource pool based at least in part on the estimated SINR, and means for communicating a signal over one or more RBs in the first resource pool. In some cases, the one or more target devices may be a user equipment (UE) engaged in autonomous discovery.

In some embodiments, the MTC device may include means for comparing the estimated SINR of the one or more RBs of the one or more target devices to a threshold SINR, and means for selecting one or more of the RBs of the one or more target devices to be in the first resource pool with an SINR less than the threshold SINR.

In some embodiments, the MTC device may include means for randomly selecting a RB from the first resource pool, and means for transmitting on the selected resource block. In some cases, the MTC device may also include means for determining a hopping pattern used by the one or more target devices, and means for hopping the selected RB based on the determined hopping pattern used by the one or more target devices.

The MTC device may also include means for estimating a distance between the MTC device and the one or more target devices and means for selecting a relay device from the one or more target devices based at least in part on the estimated distance. In some cases, the MTC device may include means for estimating SINR of the MTC device on the one or more RBs of the relay device and means for selecting of one or more of the RBs of the relay device to be in a second resource pool based at least in part on the estimated SINR of the MTC. The MTC device may also include means for communicating a signal over one or more RBs in both the first resource pool and the second resource pool to the relay device.

In other embodiments, a computer program product operable on a MTC device may include a non-transitory computer-readable medium storing instructions executable by a processor to enable the MTC device to estimate a SINR of one or more RBs of a target device, select one or more of the RBs of the target device to be in a resource pool based at least in part on the estimated SINR, and communicate a signal over one or more RBs in the resource pool.

In some embodiments, the computer program product may also include instructions executable by the processor to enable the MTC device to randomly select a RBf rom the resource pool transmit on the selected resource block. In some cases, the computer program product may also enable the MTC device to determine a hopping pattern used by the target device and hop the selected RB based on the determined hopping pattern used by the target device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
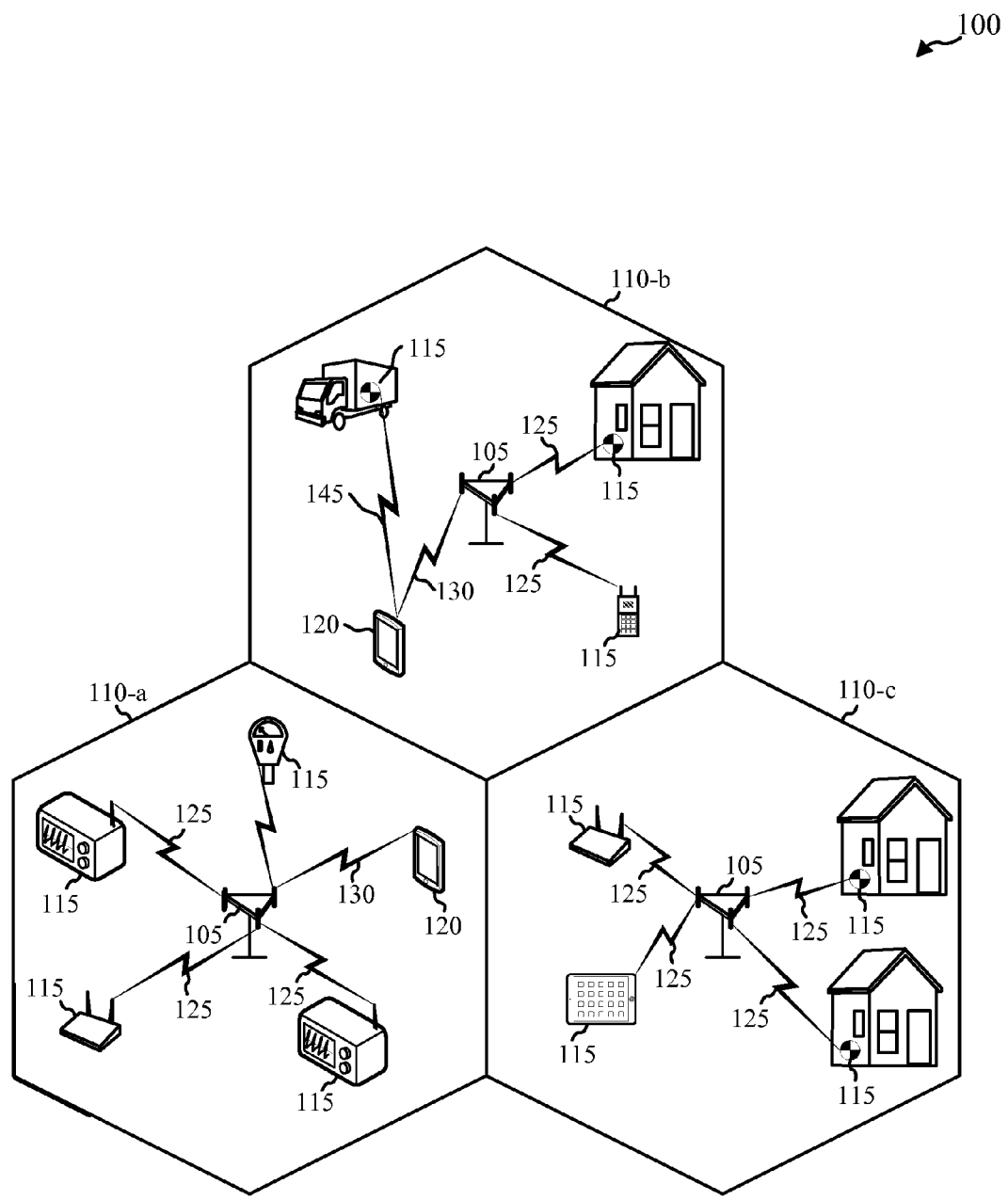
FIG. 1 shows a block diagram of a wireless communications system in accordance with various embodiments.

The described features generally relate to one or more improved systems, methods, and/or apparatuses for improving uplink communications of an MTC device. Uplink communications may be improved by opportunistically utilizing media resources of a target device, such as a mobile device or user equipment (UE). Via the described techniques, an MTC device may transmit data directly to a base station (if the MTC device is within a communication range of the base station) or to a target device (if the MTC device is not within a range of the base station and utilizes a relay node to communicate with the base station) using resources assigned to one or more target devices.

In some embodiments, in a first time period, the MTC device may select and listen to resources, such as RBs, assigned to one or more target devices in order to choose RBs for its own transmission while minimizing MTC interference to target devices within a range of the MTC device. The MTC device may estimate the signal to interference plus noise (SINR) on each RB and compare this SINR to a threshold value. If the SINR on a RB is less than a threshold value, the selected RB may be allocated to a first resource pool of the MTC device. In some cases, the first resource pool may include RBs not being used by any target device within a range of the MTC device. By specifying the threshold value to be relatively small, the interference caused by the MTC device to one or more target devices within a range of the MTC device may be minimized. The MTC device may then communicate a signal over one or more RBs in the first resource pool, for example, to the base station.

In some embodiments, if, for example, the MTC device is too far away from the base station to communicate directly with the base station, the MTC device may search for a relay node or device. First, the MTC device may listen to all RBs assigned to one or more target devices and estimate the signal strength of target devices on each RB. Based on the signal strength, the MTC device may find the closest target device to be used as a relay node. Second, the MTC device may estimate its own signal's SINR on each RB of the selected relay node. The MTC device may then build a second resource pool including the RBs on which its own SINR on the relay node is larger than a threshold. The MTC device may select an RB common to both the first and second resource pools to transmit a signal/data to the relay node, to be transmitted to the base station.

In some implementations, the target device may be involved in autonomous discovery such that it has a predefined resource usage pattern where its selected resources vary with time in a specific way. In this case, the MTC device, in order to utilize media resources of the target device, may determine the hopping pattern of the target device, select one or more RBs to utilize for MTC uplink communications or MTC data relay in a first period, and then hop to a subsequent resource in a next period based on the determined hopping pattern of the target device.

Additionally or alternatively, the MTC device can estimate the interference that it causes to the target device. For example, the MTC device may estimate the interference the MTC device may cause to the one or more RBs that the target device is transmitting on. This may be particularly useful when the MTC device transmits on the same RB for more than one period. The RBs with MTC caused interference that is less than a threshold interference may remain in the resource pool from which the MTC device can randomly select for its transmission. The MTC device may also listen to other RBs that it is not using and try to choose a new RB for its transmission in a next period following a similar procedure. In some cases, interference caused by the MTC device on the target device may be quantified by SINR, whereby the RBs with the MTC device's own SINR larger than a second threshold SINR may remain in the resource pool from which the MTC device will randomly select for its transmission.

Thus, the following description provides examples, and is not limiting of the scope, applicability, or configuration set forth in the claims. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base stations 105, communication devices 115, 120, a base station controller 135, and a core network 140 (the controller 135 may be integrated into the core network 140). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources.

The base stations 105 may wirelessly communicate with the devices 115, 120 via a base station antenna (not shown). The base stations 105 may communicate with the devices 115, 120 under the control of the base station controller 135 via multiple carriers. Each of the base station 105 sites may provide communication coverage for a respective geographic area or cell 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area (or cell) for each base station 105 here is identified as 110-*a*, 110-*b*, or 110-*c*. The coverage area for a base station may be divided into sectors (not shown, but making up only a portion of the coverage area). The system 100 may include base stations 105 of different types (e.g., macro, pico, and/or femto base stations). A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115, 120 may be dispersed throughout the coverage areas 110. Each device 115, 120 may be stationary or mobile. In one configuration, the devices 115, 120 may be able to communicate with different types of base stations such as, but not limited to, macro base stations, pico base stations, and femto base stations, via links 125, 130 respectively.

Some of the devices 115 may be machine type communication (MTC) devices 115 that perform various functions, capture information, and/or communicate information with limited or no human intervention. For example, MTC devices 115 may include sensors and/or meters for monitoring and/or tracking other devices, environmental conditions, etc. MTC devices 115 may be standalone devices or, in other embodiments, MTC devices 115 may be modules incorporated in other devices, such as target devices 120, which may in some cases be mobile devices or user equipments (UEs). For example, target devices 120 such as smart phones, cellular phones and wireless communications devices, personal digital assistants (PDAs), tablets, other handheld devices, netbooks, ultrabooks, smartbooks, notebook computers, surveillance cameras, handled medical scanning devices, home appliances, etc. may include one or more MTC device modules. In other cases, target devices 120 may not implement any MTC functionality. In the ensuing description, various techniques are described as applied to communications and processing for a system 100 including a network and one or more MTC devices 115. It should be understood that the described techniques may be advantageously applied to other devices such as those incorporating MTC devices 115 and/or other wireless communication devices.

In some implementations, an MTC device 115 may communicate with a base station 105 utilizing resources of a target device 120. In such a case, the MTC device 115 may listen to resources of a target device 120 via link 145. The MTC device 115 may then communicate with the base station 105 via the resources of the target device 120, such as over links 145 and 130. In other embodiments, MTC devices 115 may communicate directly with a base station 105 over links 125.

The information collected by the MTC devices 115 may be transmitted across a network that includes components of system 100 to a back-end system, such as a server. The transmission of data to/from the MTC devices 115 may be routed through the base stations 105. The base stations 105 may communicate with the MTC devices 115 on a forward link for transmitting signaling and/or information to the MTC devices 115 and a reverse link for receiving signaling and/or information from the MTC devices 115.

In one example, the network controller 135 may be coupled to a set of base stations 105 and provide coordination and control for these base stations 105. The controller 135 may communicate with the base stations 105 via a backhaul (e.g., core network 140). The base stations 105 may also communicate with one another directly or indirectly and/or via wireless or wireline backhaul.

The different aspects of system 100, such as the MTC devices 115, the target devices 120, the base stations 105, the core network 140, and/or the controller 135 may be configured to enable an MTC device 115 to utilize resources, such as resources blocks (RBs), of a target device 120. A target device 120 (or UE) may help close the link between an MTC device 115 and a base station 105 via acting as a relay between the MTC device and the base station 105. An MTC device 115 may select and listen to one or more RBs assigned to one or more target devices 120. If the MTC device 115 determines that an SINR of the target device RB is less than a threshold SINR, then it may select that RB for future utilization by placing the RB in a first resource pool, such as for communicating uplink data to a base station or eNB 105.

In some cases, the MTC device 115 may choose a candidate relay target device 120 based on an estimated distance of the device 120 from the MTC device 115. The MTC device 115 may listen to all RBs assigned to one or more target devices 120 and estimate the signal strength of target devices 120 on each RB. Based on the signal strength, the MTC device 115 may find the target device 120 with the highest single strength (closest target device 120) and select this device 120 to be the relay node. Second, the MTC device 115 may estimate its own signal's SINR on each RB of the selected relay node 120. The MTC device 115 may then build a second resource pool including the RBs on which its own SINR on the relay node 120 is larger than a threshold. The MTC device 115 may select an RB common to both the first and second resource pools to transmit signal/data to the relay node 120, to be transmitted to the base station 105.

In some embodiments, a target device 120 may be involved in autonomous discovery such that it has a predefined resource usage pattern where its selected resources vary with time in a specific way. In this case, the MTC device 115 can determine the hopping pattern of a target device 120 and select one or more RBs of the target device 120 to utilize for uplink communications in a first period. The MTC device 115 may then hop its selected RB in a next period to follow the determined hopping pattern of the target device 120. The MTC device 115 can also listen to other RBs of a target device 120 or of another device that it is not using and try to select a new RB for its transmission in a next period following a similar procedure.

In some embodiments, the MTC device 115 may estimate the interference that it causes to a selected target device 120, such as to one or more RBs that the target device 120 is transmitting on. This may be particularly useful when the MTC device 115 transmits on the same RB for more than one period. The RBs with MTC caused interference less than a threshold interference may remain in the resource pool from which the MTC device 115 can randomly select for its transmission. The RBs with MTC caused interference less than a threshold interference may be allocated to the final resource candidate pool from which the MTC device 115 can randomly select for its transmission. In some cases, interference caused by the MTC device 115 on the target device 120 may be quantified by SINR, whereby the RBs with the MTC device's own SINR larger than a second threshold SINR can be allocated to the final resource candidate pool from which the MTC device 115 will randomly choose one for its transmission.

Figure 2:
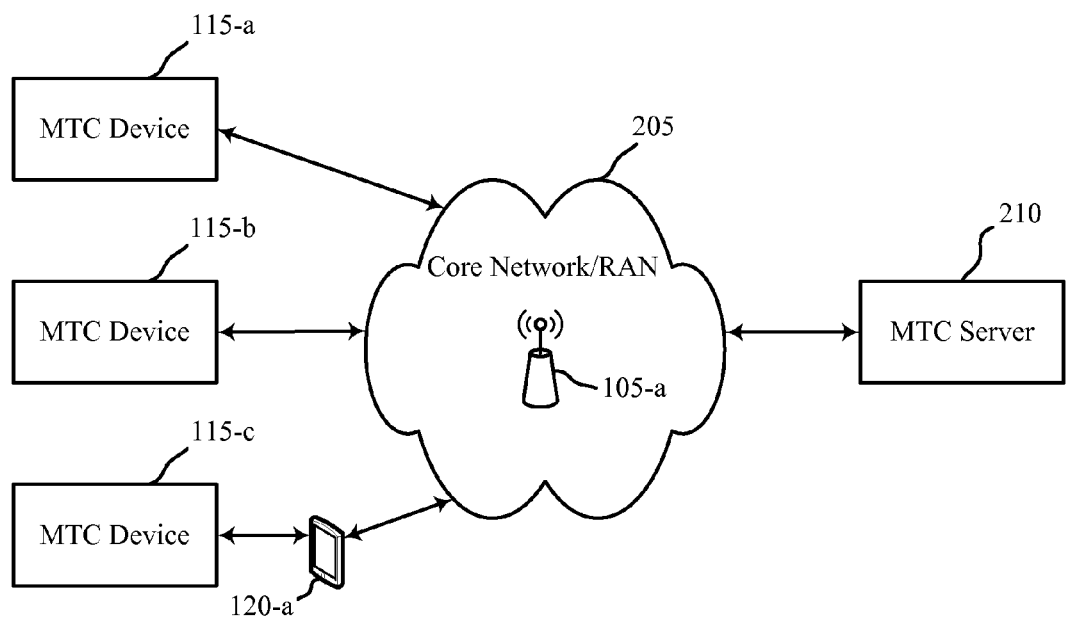
FIG. 2 illustrates an example of a wireless communication system implementing MTC service in accordance with various embodiments.

FIG. 2 illustrates an example of a wireless communication system 200 including a Radio Access Network (RAN) or Core Network 205 implementing a machine type communication service according to one aspect. The system 200 may include any number of MTC devices 115, however for ease of explanation only three MTC device 115-a, 115-b, and 115-c are shown in communication with an MTC server 210. Communications between the server 210 and MTC devices 115-a, 115-b, and 115-c may be routed through a base station 105-a that may be considered part of the Core Network/RAN 205. The base station 105-a may be an example of the base stations 105 illustrated in FIG. 1. The MTC devices 115-a, 115-b, and 115-c may be examples of the MTC devices 115 illustrated in FIG. 1, or may be examples of modules of the target devices 120 illustrated in FIG. 1. One skilled in the art would understand that the quantity of MTC devices 115, Core Networks/RANs 205, and MTC servers 210 shown in FIG. 2 is for illustration purposes only and should not be construed as limiting.

The wireless communication system 200 may be operable to facilitate machine type communication between one or more MTC devices 115 and/or one or more base stations 105-*a*. Machine type communication may include communications between one or more devices without human intervention. In one example, machine type communication may include the automated exchange of data between a remote machine, such as an MTC device 115-*a*, 115-*b*, 115-*c*, and a back-end IT infrastructure, such as the MTC server 210, without user intervention. The transfer of data from an MTC device 115-*a*, 115-*b*, 115-*c* to the MTC server 210 via the Core Network/RAN 205 (e.g., the base station 105-*a*) may be performed using reverse or uplink link communications. Data collected by the MTC devices 115-*a*, 115-*b*, 115-*c* (e.g., monitoring data, sensor data, meter data, etc.) may be transferred to the MTC server 210 on the uplink communications.

The transfer of data from the MTC server 210 to an MTC device 115-*a* via the base station 105-*a* may be performed via forward or downlink link communications. The forward link may be used to send instructions, software/firmware updates, and/or messages to the MTC devices 115-*a*, 115-*b*, 115-*c*. The instructions may instruct the MTC devices 115-*a*, 115-*b*, 115-*c* to remotely monitor equipment, environmental conditions, etc. Machine type communication may be used with various applications such as, but not limited to, remote monitoring, measurement and condition recording, fleet management and asset tracking, in-field data collection, distribution, physical access control, and/or storage, etc. The base station 105-*a* may generate one or more forward link frames with a small number of channels to transmit instructions, software/firmware updates, and/or messages. The various MTC devices 115-*a*, 115-*b*, 115-*c* may wake up to monitor a specific frame when instructions or other data is included on a channel of that frame.

In one embodiment, the behavior of the MTC devices 115-*a*, 115-*b*, 115-*c* may be pre-defined. For example, the day, time, etc. to monitor another device and transmit the collected information may be pre-defined for an MTC device 115-*a*, 115-*b*, 115-*c*. For example, the MTC device 115-*a* may be programmed to begin monitoring another device and collect information about that other device at a first pre-defined time period. The MTC device 115-*a* may also be programmed to transmit the collected information at a second pre-defined time period. The behavior of an MTC device 115-*a* may be remotely programmed to the device 115-*a*.

In some embodiments, one or more MTC devices 115-*a*, 115-*b*, 115-*c* may have data to send to the MTC server 210, for example through the core network/RAN 205 via base station 105-*a*. In other cases, the MTC server 210 may request data from the one or more MTC devices 115-*a*, 115-*b*, 115-*c*. In either case, an MTC device 115-*a*, 115-*b*, 115-*c* may have uplink data to communicate to a base station 105-*a* to be relayed to the MTC server 210. Given that MTC devices 115-*a*, 115-*b*, 115-*c* may be narrow frequency band devices and/or may have limited power resources, they may not be able to effectively and timely communicate data on the uplink to a base station 105-*a* and/or the MTC server 210. An MTC device, 115-*c* may opportunistically utilize uplink resources, such as one or more RBs of a target device 120-*a*, to communicate uplink data to a base station 105-*a* and/or the MTC server 210. In some cases, the MTC device 115-*c* may relay information to the base station 105-*a* via the target device 120-*a* over resources of the target device 120-*a*, for example, when the MTC device 115-*c* is too far away from the base station 105-*a* to communicate directly. These techniques will be described in further detail below in reference to FIGS. 3-5.

Figure 3:
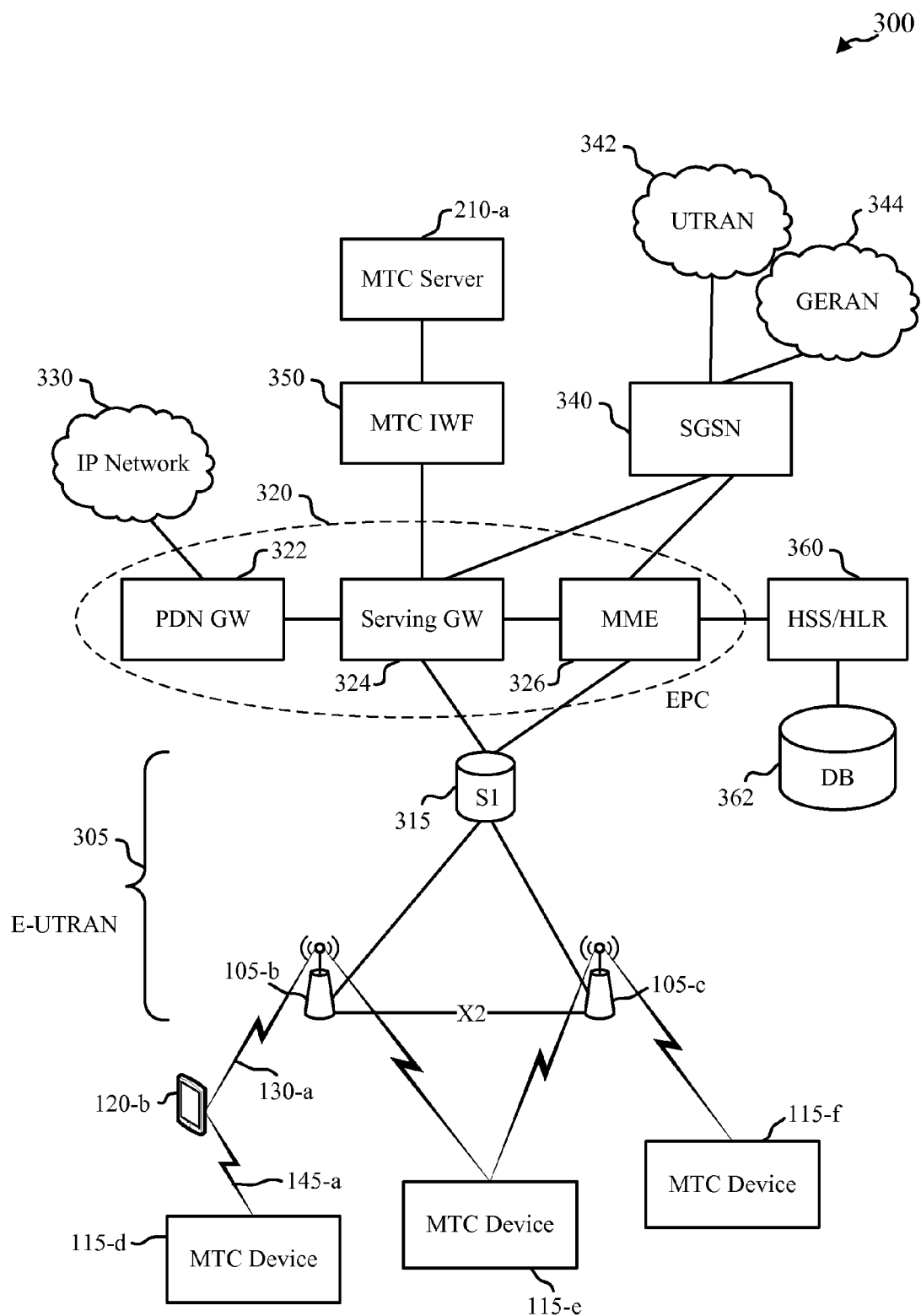
FIG. 3 illustrates an example of a wireless communication system implementing MTC service in accordance with various embodiments.

FIG. 3 illustrates an example of a wireless communications system 300 implementing a machine type communication service over an LTE/LTE-Advanced network in accordance with various embodiments. The LTE/LTE-A network may include Evolved Universal Terrestrial Radio Access Network (E-UTRAN) 305 and Evolved Packet Core (EPC) 320. The LTE E-UTRAN 305 and EPC 320 may be configured for supporting end-to-end packet-switched communications. EPC 320 may include a Packet Data Network (PDN) Gateway 322. The PDN Gateway 322 may be connected to one or more Internet Protocol (IP) Networks 330. IP Networks 330 may include Operator IP Networks as well as external IP Networks. For example, IP Networks 330 may include the Internet, one or more Intranets, an IP Multimedia Subsystem (IMS), and a Packet Switched (PS) Streaming Service (PSS). The PDN Gateway 322 may provide UE IP address allocation as well as other functions. The EPC 320 may interconnect with other access networks using other Radio Access Technologies (RATs). For example, EPC 320 may interconnect with UTRAN 342 and/or GERAN 344 via one or more Serving GPRS Support Nodes (SGSNs) 340.

EPC 320 may include one or more Serving Gateways 324 and/or Mobility Management Entities (MME) 326. The Serving Gateway 324 may handle the interface to E-UTRAN 305 and provide a communication point for inter-RAT mobility (e.g., handover to UTRAN 342 and/or GERAN 344, etc.). Generally, the MME 326 may provide bearer and connection management while the Serving Gateway 324 may transfer user IP packets between base stations 105 and other network end-points (e.g., PDN GW 322, etc.). For example, MME 326 may manage intra-RAT mobility functions (e.g., Serving Gateway selection) and/or UE tracking management. The Serving Gateway 324 and the MME 326 may be implemented in one physical node of EPC 320 or in separate physical nodes. A Home Subscriber Service (HSS) and/or home location register (HLR) node 360 may provide service authorization and/or user authentication for UEs. HSS/HLR node 360 may communicate with one or more databases 362.

E-UTRAN 305 may include one or more base stations or eNBs 105-*b*, which provide user and control plane protocol terminations for MTC devices 115-*d*, 115-*e*, 115-*f*, and/or a target device or UE 120-*b* over the air interface of the LTE network. eNBs 105-*b* may be connected with an X2 interface for intra-eNB communication. Base station 105-*b* may be connected to Serving Gateway 324 and/or MME 326 over an S-1 interface 315 for communicating data traffic and/or control plane information. The MTC devices 115-*d*, 115-*e*, 115-*f*, and/or the target device 120-*b* may be configured to collaboratively communicate with multiple base stations 105 through, for example, Multiple Input Multiple Output (MIMO), Coordinated Multi-Point (CoMP), or other schemes as described in more detail below.

In some embodiments, wireless communications network 300 includes an MTC inter-working function (IWF) module 350, which may provide an interface between EPC 320 and one or more external MTC Servers 210-*a* for providing MTC service within the LTE network. MTC server 210-*a* may be an example of MTC server 210 of FIG. 2. MTC server 210-*a* may be operated by the proprietor of MTC devices 115 and may perform functions associated with deployment of MTC devices 115 such as receiving and processing MTC device data. MTC server 210-a may be connected directly to EPC 320 or may be connected through MTC IWF module 350 and/or other networks such as the Internet. MTC IWF module 350 may be implemented in one or more existing physical nodes of the EPC 320 (e.g., Serving Gateway 324, etc.), or in a separate physical node connected to EPC 320.

Wireless communications network 300 may further support MTC utilization of media resources for uplink communications to a base station 105. For example, MTC device 115-e may listen to, via link 145-a, and select an RB of a target device 120-b that has an SINR less than a threshold SINR. One or more RBs of the target device 120-b may in some cases be represented by link 130-a between the target device 120-b and the base station 105-b. In one configuration, once the MTC device 115-d selects an RB of the target device 120-b, the MTC device 115-d may communicate directly, for example on the uplink, with base station 105-b. In this implementation, the MTC device 115-d may transmit communications, such as uplink communications, to the target device 120-b to be relayed to the base station 105, for example via both link 130-a.

Figure 4:
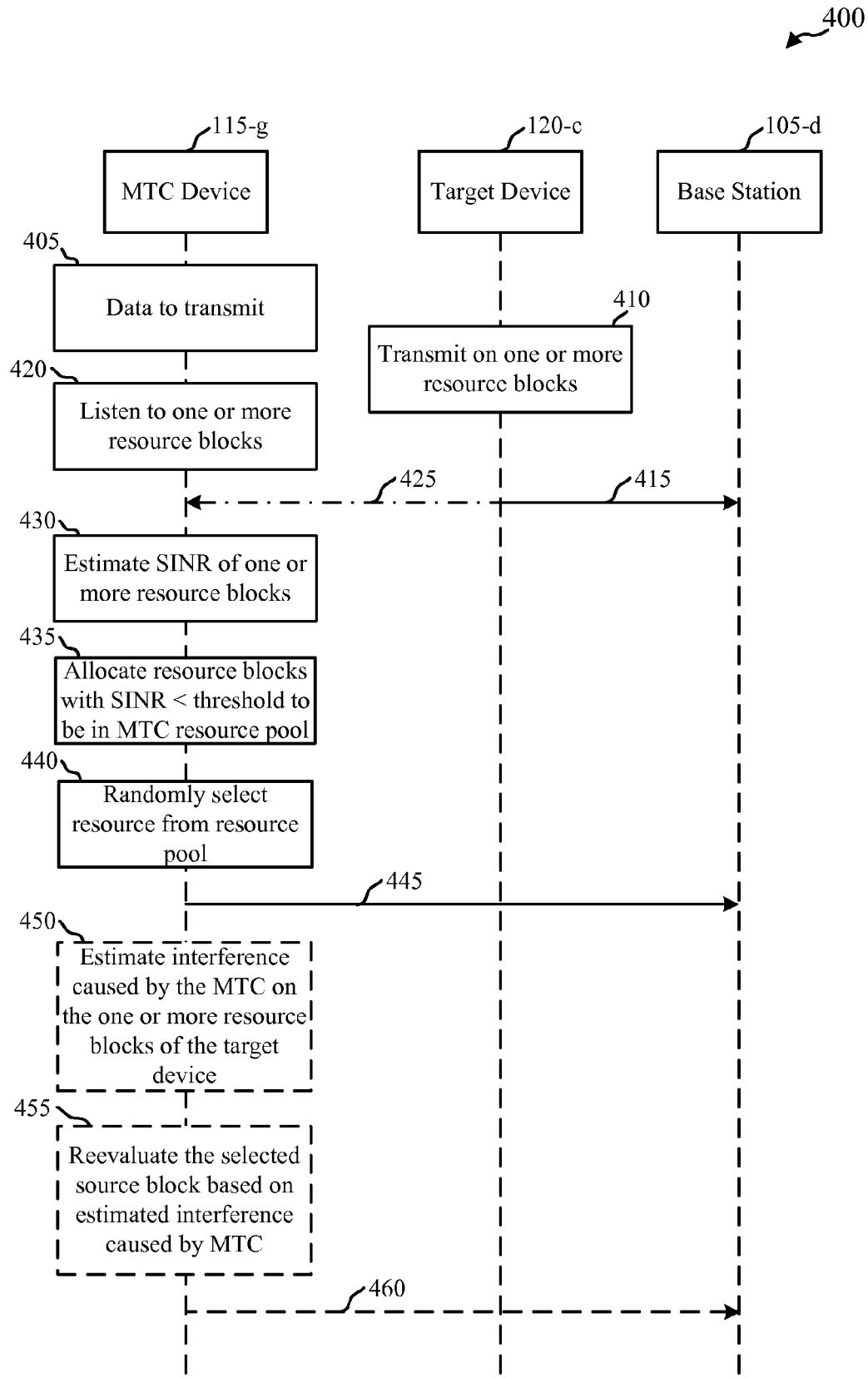
FIG. 4 shows a flow diagram for improving uplink communications of an MTC device by utilizing resources of a target device in accordance with various embodiments.

Turning next to FIG. 4, a flow diagram 400 illustrates an example of an MTC device 115-g utilizing one or more RBs of a target device 120-c for uplink communication with a base station 105-d in accordance with various embodiments. The MTC device 115-g may be an example of the MTC device 115 of FIGS. 1, 2, and/or 3. The MTC device 115-g may have data to transmit 405 to an MTC server 210, such as through a core network/RAN 205 via a base station 105-d. Base station 105-d may be an example of base station 105 of FIGS. 1, 2, and/or 3. A target device 120-c, which may be an example of target device or UE 120 of FIGS. 1 and/or 3, may transmit from time to time on one or more RBs 410. In some cases the target device 120-c may transmit 415 on one or more RBs to the base station 105-d. In either case, the MTC device 115-g may listen to one or more RBs 420 of the target device 120-c. The MTC device 115-g may intercept or receive a transmission 425 on one or more RBs of the target device 120-c. The MTC device 115-g may then estimate an SINR of the one or more RBs 430 of the target device 120-c. The MTC device may then compare the SINR of the received RB of the target device 120-c with an SINR threshold. The MTC device 115-g may allocate the RBs with an SINR less than the threshold SINR to an MTC resource pool 435.

In some embodiments, the MTC device 115-g may periodically listen to one or more RBs 420, intercept 425 one or more RBs, estimate the SINR of the one or more RBs 430, and allocate RBs with SINR less than a threshold SINR to be in an MTC resource pool 435. In some cases, the MTC device 115-g may carry out the processes 420, 425, 430, and 435 when it has data to transmit, for example to conserve power of the MTC device 115-g. In yet other implementations, the MTC device 115-g may carry out the processes 420, 425, 430, and 435 when it is triggered by the MTC server 210, 210-a and or E-UTRAN 305. This embodiment may also conserve power of the MTC device 115-g by having the MTC device 115-g power up on demand.

In other cases, the MTC device 115-g may measure one or more other metrics of one or more RBs of the target device 120-c to determine suitable RBs for communicating uplink data to the MTC server 210, 210-a and/or the E-UTRAN 305. The one or more other metrics may include, for example, SNR, SIR, signal strength, or other interference metrics.

The MTC device 115-g may randomly select a resource from the resource pool 440 to be used for transmission of uplink data. The MTC device may then transmit data on the selected RB from the resource pool 445 to the base station 105-d. In some cases, the MTC device may transmit data directly to the base station 105-d using the selected RB of the target device 120-c. In other cases, the MTC device may relay data for uplink transmission to the target device 120-c via a P2P link, such as LTE-Direct, which can forward the uplink data via the selected RB to the base station 105-d.

In some embodiments, the MTC device 115-g may transmit data on the same selected RB for multiple periods/frames. In this case, the MTC device 115-g may reevaluate the selected RB upon which it is transmitting to, for example, ensure that interference caused by its own transmission is not negatively impacting communications of the target device 120-c. For example, the MTC device 115-g may estimate interference 450 caused by the MTC on one or more RBs of the target device 120-c. The MTC device 115-g may then reevaluate the selected source block based on estimated interference caused by MTC. The MTC device 115-g may measure or estimate interference caused by transmission of the selected RB of the target device 120-c on other RBs of the target device 120-c. The MTC device 115-g may then compare the measured interference with an interference threshold, which can be predetermined or set by the network, for example. If the measured interference is less than the threshold interference, the MTC device 115-g may keep the selected resource in its resource pool and may transmit the uplink data on the selected RB 460 in a next period. In some cases, interference caused by the MTC device 115-g on the target device 120-c may be quantified by SINR, whereby if the drop in SINR of the target 120-c RB, caused by the MTC device 115-g, is less than an SINR threshold, that RB will remain in the resource pool for future transmissions.

In other cases, the MTC device 115-g may reevaluate all the RBs in its resource pool based on interference caused by the MTC device 115-g on the target device 120-c. If the measured interference is less than the threshold interference, the MTC device 115-g may keep the selected resource in it resource pool for future transmission. If the measured interference is greater than the threshold, the MTC device 115-g may remove that RB from its resource pool. In some embodiments, SINR may be used as the interference metric, whereby RBs with an SINR greater than an SINR threshold may be kept in the MTC device's resource pool for future transmissions.

The MTC device 115-g may also listen to other RBs that it is not using and try to choose a new RB for its transmission in a next period following a similar procedure.

As described in reference to FIG. 4, only one target device 120-c and one base station 105-d are shown. However, it should be appreciated that the above-described techniques may beneficially be implemented with more than one target device 120 and/or more than one base station 105.

Figure 5:
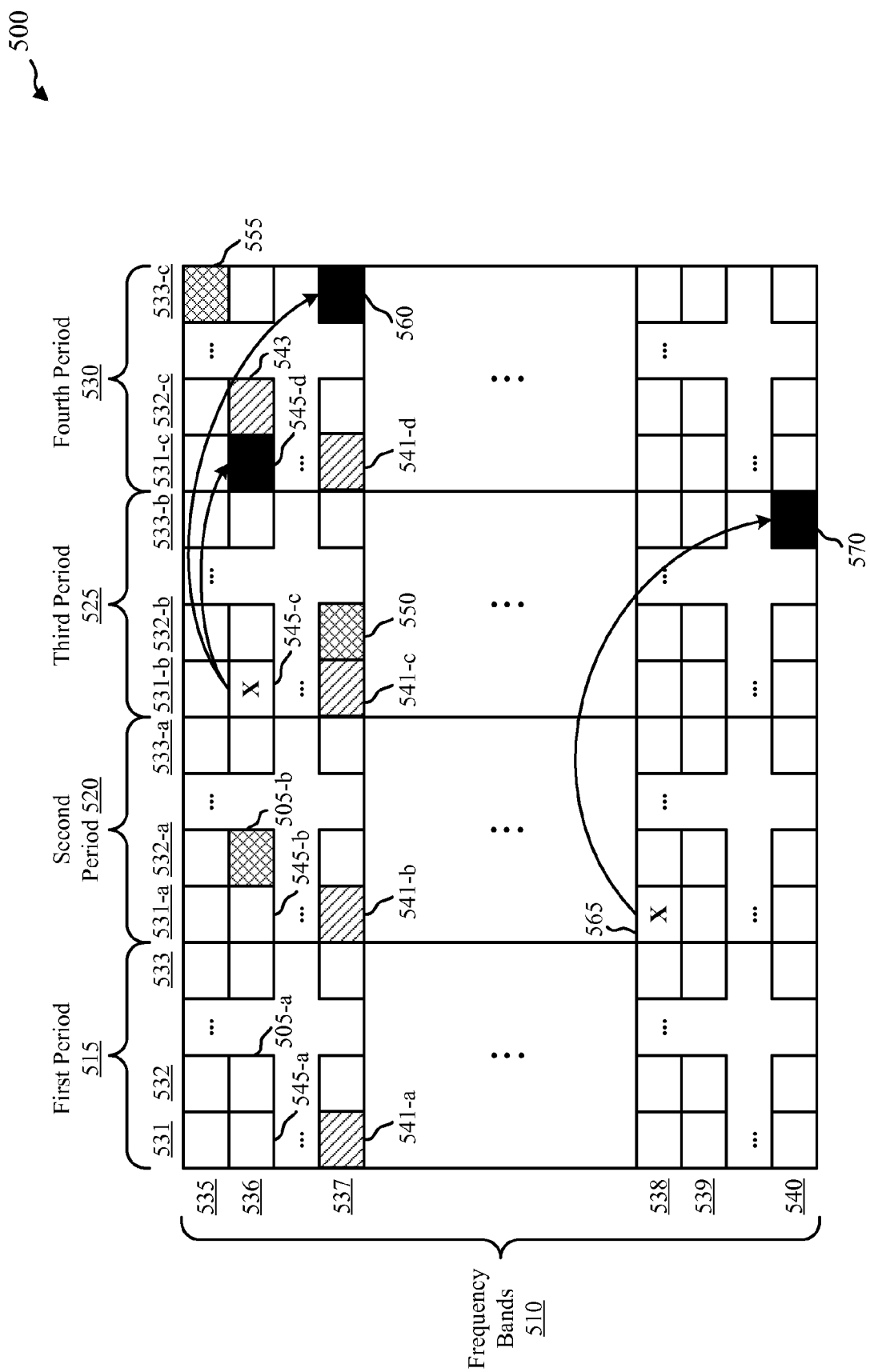
FIG. 5 shows a block diagram illustrating resources of a target device in accordance with various embodiments.

Turning next to FIG. 5, a resource block diagram 500 is illustrated representing media resources of a target device 120 that may be utilized by both the target device 120 and an MTC device 115 in accordance with the techniques described above in reference to FIGS. 1, 2, 3, and/or 4. Diagram 500 shows a number of RBs, such as RB 505-a, in grid with frequency bands 510 represented on the vertical axis and time via multiple periods on the horizontal axis. Each time period 515, 520, 525, 530 may be defined by a number of time slots. For example, a first period 515 includes time slots 531, 532, . . . 533, a second period 520 includes time slots 531-*a*, 532-*a*, 533-*a*, etc. In some cases, time slots 531, 532, . . . 533 may represent 0-64 time slots. The location of each RB may be defined in diagram 500 by a frequency value and a time value within a given period. For example RB 505-*a* is located at time slot 532 in the first period 515 and at frequency 536. RB 505-*b* may be in the same relative time-frequency location, but subsequent in time to RB 505-*a*, such that RB 505-*b* is in the second period 520. Each frequency, such as frequency 535 may be grouped in a larger frequency band which may contain multiple frequencies, such as frequencies 535, 536, 537. In some cases, frequencies 535, 536, 537 may represent 0-5 different frequencies. Within this time frequency framework, the location and movement across multiple periods 515, 520, 525, 530 of RBs utilized by a device, such as a target device 120 and/or an MTC device 115 may be shown.

For example, a target device 120 may select an RB 541-*a* at time slot 531 and frequency 537 on which to transmit certain data to another entity, such as another device (e.g., another UE, an MTC device 115, a base station 105, etc.). In some cases, the target device 120 may then transmit on a RB 541-*b* in a second period 520. RB 541-*b*, located at time slot 531-*a* and frequency 537, may have the same relative time frequency location in the second period 520 as RB 541-*a* located at time slot 531 and frequency 537 in the first period 515. In this described embodiment, the target device 120 may transmit on the RBs 541-*a*, 541-*b*, 541-*c*, and 541-*d* with the same relative location in each period 515, 520, 525, and 530.

In this scenario, the MTC device 115 may listen to RBs used by the target device 120 for a number of periods before choosing a candidate RB for which to estimate interference, such as SINR. For example, the MTC device 115 may choose to listen to RB 545 after determining, for example in previous periods, that the target device 120 is not frequency hopping its RBs. In the example shown, the MTC device 115 may determine in periods prior to first period 515, that the target device 120 is continually transmitting on RB 540 for multiple periods. The MTC device 115 may then choose to listen to RB 545-*a* and 545-*b* in the first and second periods 515, 520 to determine an SINR value for that particular RB to further determine if it can use RB 545, such as RBs 545-*c*, 545-*d* for future transmissions. The MTC device 115 may determine after listening to RBs 545-*a*, 545-*b* in the first and second periods 515, 520, that the SINR of RB 545 is below a threshold SINR, such that it places RB 545, and more particularly RB 545-*c* and 545-*d*, into its resource pool for future transmissions.

In the third period 525, the MTC device 115 may choose RB 545-*c* for transmission of uplink data, such as to a base station 105. The MTC may then transmit directly on RB 545-*c* to base station 105 in the third period 525. As the MTC device 115 previously determined that the target device 120 is not engaging in frequency hopping, at least for transmissions on RB 540, the MTC device 115 may then transmit on RB 545-*d* in the fourth period 530. In this way, the MTC device 115 can utilize resources of the target device 120 to expand its own uplink budget without significantly impacting existing communications of the target device 120.

In another example, the MTC device 115 may listen to resources used by the target device 120 for transmissions in the first and second periods 515, 520. In this scenario, the MTC device 115 may determine that the target device 120 is hopping its resources, for example, because it is engaged in autonomous discovery.

In some cases, the target device 120 may be involved in autonomous discovery such as a consistent process relying on LTE-D's media access control (MAC) address. Based on this MAC address, the target device 120 may select an RB and resource hop based on a pre-defined sequence. However, MTC data may be small, transmitted only occasionally, and often delay-tolerant such that it may not be well suited for the MAC address used by autonomous discovery, particularly because the autonomous discovery MAC address may use sophisticated signal processing which consumes resources and power. As a result, a relay of MTC data may be compatible with, and used simultaneously with, autonomous discovery devices, such as target device or UE 120.

In this scenario, the MTC device 115 may observe that the target device 120 first transmits on RB 541-*a* at time slot 531, and frequency 537 in the first period 515. The MTC device 115 may then observe that the target device 120 transmits on RB 505-*b* at time slot 532-*a* and frequency 536 in the second period 520. Based on this frequency hopping, the MTC device 115 may determine a hopping pattern of the target device 120. Based on the determined hopping pattern of the target device 120, the MTC device 115 may further determine that the target device 120 will transmit on RB 550 at time slot 532-*b* and frequency 537 in the third period 525. Accordingly, the MTC device 115 may choose an RB different from RB 550, such as RB 545-*c*, for transmission in the third period 525. In some cases, the MTC device 115 may have placed RB 545-*c* in its resource pool based on the estimated SINR of RB 545-*c* being below a threshold SINR value, previously determined by the MTC device 115. Based on the known hopping pattern of the target device 120, the MTC device 115 may then determine that target device 120 will transmit on RB 555 at time slot 533-*c* and frequency 535 in the fourth period 530. Accordingly, the MTC device can select to transmit on RB 560 at time slot 533-*c* and frequency 537 in the fourth period 530 to avoid conflict with the hopping pattern of the target device 120. In some cases, the MTC device 115 may have already selected RB 555 to be in its resource pool based on measured SINR values of RB 555. In other cases, the MTC device 115 may determine that RB 555 has an SINR less than a threshold SINR in the first, second, third periods 515, 520, 525 and/or other prior periods.

In some cases, the MTC device 115 may hop the RBs it transmits on in subsequent periods according to a determined hopping pattern of the target device 120. In other cases, the MTC device 115 may hop the RBs it transmits on to avoid collisions, e.g., using the same RB that a target device 120 hops to, while not necessarily following the hopping pattern of the target device 120. As a result, the MTC device 115 may hop its pooled resources in a different pattern than the determined hopping pattern for the target device 120.

In some embodiments, the MTC device 115 may have a wide band receiver to listen to an increased number of frequencies and an increased number of RBs used by the target device 120. For example, the MTC device 115 may listen to RBs on frequencies 538, 539, and 540. In one example, the MTC device 115 may determine that RB 565 has an SINR value less than a given threshold, and may transmit on RB 565 in the second period 520. Based on a determined hopping pattern of the target device 120, the MTC device 115 may then hop to RB 570 at time slot 533-*b* and frequency 540 in the third period 525 to avoid negatively impacting existing transmissions of the target device 120.

In some embodiments, when the MTC device 115 transmits on RB 545 for multiple consecutive periods, the MTC device 115 may also measure or estimate interference caused on other RBs used by the target device 120, such as RB 541-b in the second period 520. If the interference on RB 541-b caused by the MTC device 115 is too great, e.g., above a threshold, the MTC device 115 may remove RB 545-c from its resource pool for the third period 525 according to the techniques described above in reference to FIGS. 1, 2, 3, and/or 4.

In some cases, the exact period length of each period 515, 520, 525, 530, etc. may be determined by the base station 105. For example, in autonomous discovery, each period may also be referred to as a discovery period. The length of the discovery period, which may persist for multiple periods, may be broadcast by the base station or eNB 105. Based on this broadcast length, each RB of a given period may align in frequency and relative time slot with an RB in a next period, separated by a single period length, and so on. This time frequency relationship allows an MTC 115 device to predict usage and time-frequency position of future RBs with accuracy.

The above description is given only as an example, and as such the specific locations of RB's and the particular hopping patterns used should not be viewed as limiting the scope of the claimed subject matter.

Figure 6:
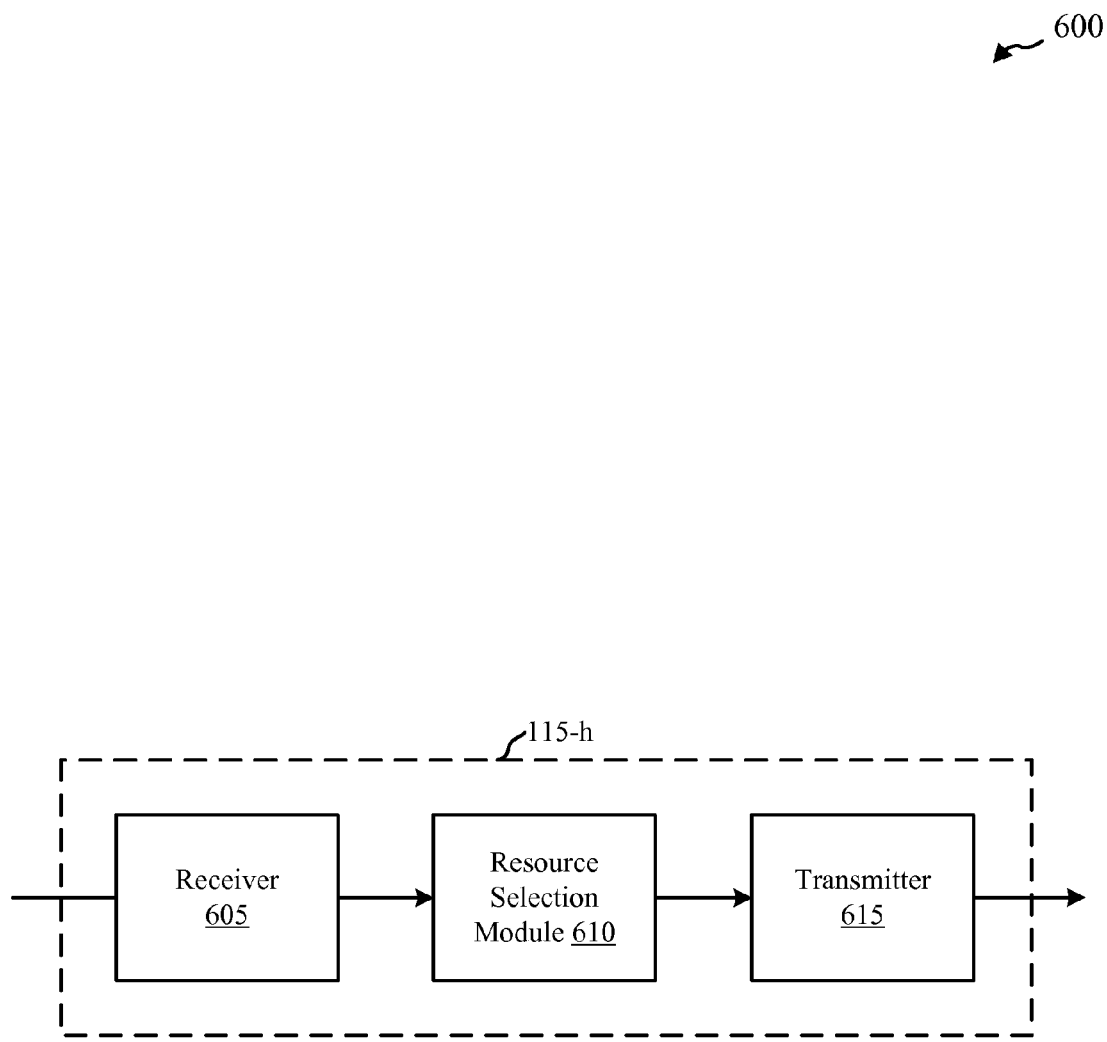
FIG. 6 is a block diagram illustrating a device for utilizing resources of target device for uplink communications in accordance with various embodiments.

FIG. 6 shows a block diagram 600 of a device 115-h for utilizing one or more RBs of another device, such as a target device 120, for uplink communication with yet another device, such as a base station 105, in accordance with various embodiments. The device 115-h may be an example of one or more aspects of the MTC device 115 described above with reference to FIGS. 1, 2, 3, 4, and/or 5 and/or the target device 120 described in reference to FIGS. 1, 3, and/or 4. The device 115-h may include a receiver module 605, a resource selection module 610, and/or a transmitter module 615. Each of these components may be in communication with each other.

The receiver 605 may receive information such as packet, data, and/or signaling information regarding what the device 115-h has received or transmitted. The received information may be utilized by the resource selection module 610 for a variety of purposes. In some cases, receiver 605 may be configured to receive data or transmissions, for example from a target device 120, to further enable the various techniques described above for utilizing uplink resources of the target device 120 to transmit data to a base station 105.

The transmitter 615 may similarly transmit information such as packet, data, and/or signaling information from the device 115-h. In some cases, transmitter 615 may be configured to send uplink data according to various embodiments described herein, such as over one or more RBs of a target device 120 to a base station 105.

In particular, the receiver module 605 may be configured to receive (or intercept) one or more transmissions from a target device 120. The receiver module 605 may then communicate the one or more received/intercepted transmissions to the resource selection module 610. The resource selection module 610 may estimate the SINR of the one or more received transmissions to determine which RBs may be placed in a resource pool of the device 115-h. This may include the RBs with an SINR less than a threshold SINR. The resource selection module 610 may then randomly select an RB from the resource pool for transmitting on the uplink, for example to a base station 105 via the transmitter 615. In some embodiments, the device 115-h may transmit directly on the chosen RB to the base station 105. In other embodiments, the device 115-h may relay the data for uplink transmission to the target device 120 across a P2P connection, such as a LTE-D connection. The target device 120 may then forward the uplink data via the selected RB to the base station 105.

Figure 7:
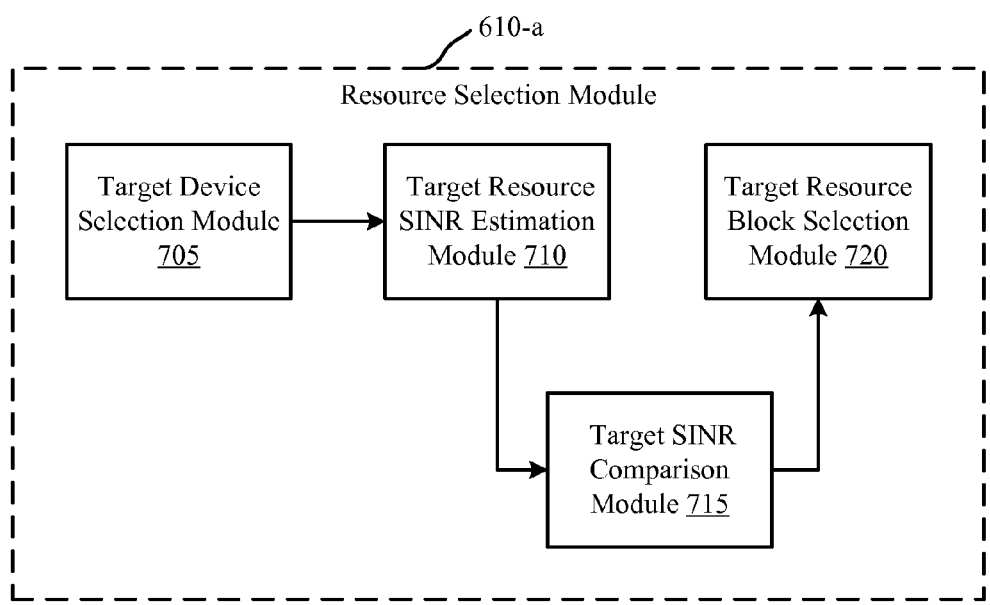
FIG. 7 is a block diagram illustrating one embodiment of a resource selection module in accordance with various embodiments.

FIG. 7 is a block diagram 700 illustrating one embodiment of a resource selection module 610-a. The resource selection module 610-a may be an example of the resource selection module 610 of FIG. 6, and may be in communication with a receiver 605 and transmitter 615 as also described in reference to FIG. 6. In one example, the module 610-a may include a target device selection module 705, a target resource SINR estimation module 710, a target SINR comparison module 715, and a target resource block selection module 720.

In one embodiment, the target device selection module 705 may measure received signals from one or more target devices 120 to determine distances of the one or more target devices 120 from the device 115-h. The target device selection module 705 may obtain the received signals from the receiver 605 of FIG. 6. The target device selection module 705 may measure the signal strength of signals received from the one or more target devices 120 to determine which target device is the closest in distance. The closet target device may be the device with the largest signal strength. The target device selection module 705 may then select the closest target devices 120 as a candidate relay device and communicate this to the target resource SINR estimation module 710. In some cases, by narrowing the pool of potential target devices, the device 115-h may quickly find a suitable RB to place in its resource pool. This may be due to a limited amount of RBs the device 115-h will have to listen to from only a single or limited number of candidate target devices 120.

The target resource SINR estimation module 710 may then direct the receiver 605 to listen for transmissions of the selected candidate target device 120 on one or more candidate RBs. The target resource SINR estimation module 710 may then estimate the SINR of one or more received signals on these potential candidate RBs. In other embodiments, the target resource SINR estimation module 710 may estimate/measure other metrics, such as SNR, SIN, or other interference metrics to aid in determining a suitable RB to place in the resource pool for later transmissions. The target resource SINR estimation module 710 may then communicate the SINR values of the one or more candidate RBs to the target SINR comparison module 715.

The target SINR comparison module 715 may compare the received SINR values for the one or more candidate RBs with a threshold SINR. In some cases, the threshold SINR may be determined by the network, MTC server 210, device 115-h, or preset, for example. The target SINR comparison module 715 may then determine which candidate RBs have an SINR less than the threshold SINR, for example to protect existing communications of the target device 120. The target SINR comparison module 715 may then send the comparison information to the target resource block selection module 720.

The target resource block selection module 720 may select the candidate RBs with a SINR less than the SINR threshold and place those selected RBs in a resource pool of device 115-h for future transmissions. In some embodiments, the target resource block selection module 720 may also select one or more RBs for transmitting uplink data from the device 115-h to another device, such as a base station 105. Transmission of the uplink data may be carried out, for example, by the transmitter 615 of device 115-h. In some cases, the target resource block selection module 720 may randomly select one or more RBs for transmitting uplink data from the device 115-h.

Figure 8:
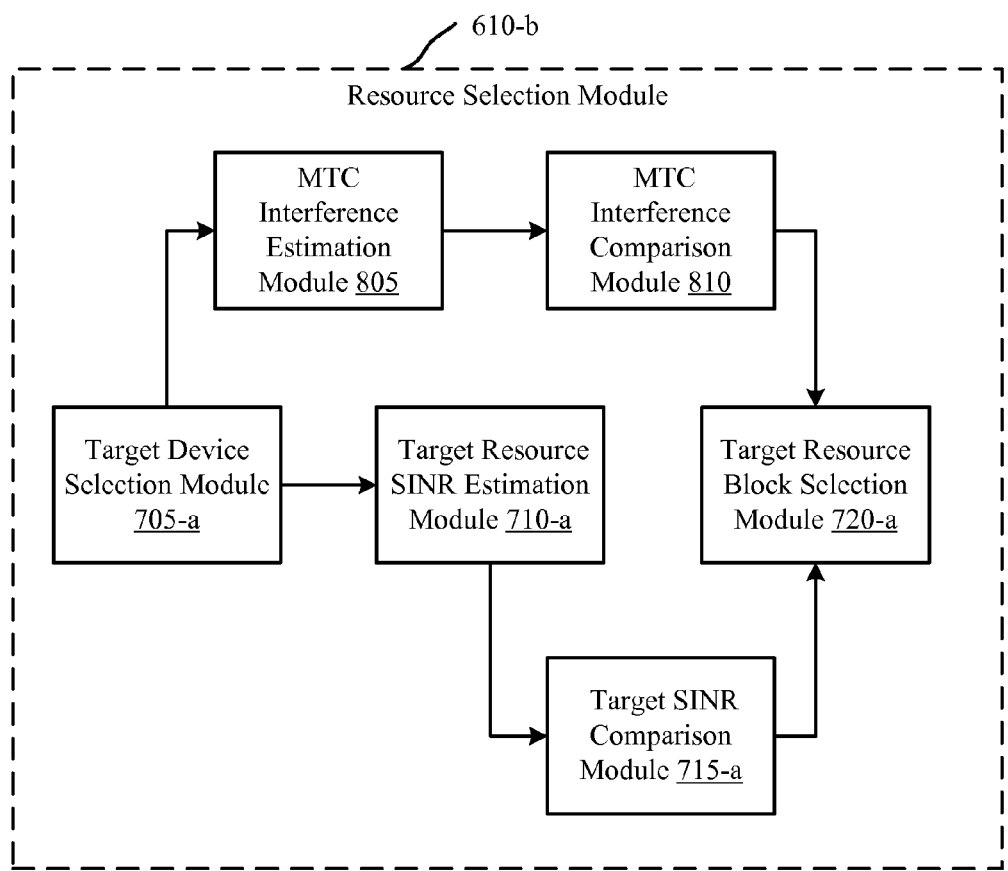
FIG. 8 is a block diagram illustrating another embodiment of a resource selection module in accordance with various embodiments.

FIG. 8 is a block diagram 800 illustrating one embodiment of a resource selection module 610-b. The resource selection module 610-b may be an example of the resource selection module 610 of FIGS. 6 and/or 7. In one example, the resource selection module 610-b may include a target device selection module 705-a, a target resource SINR estimation module 710-a, a target SINR comparison module 715-a, a target resource block selection module 720-a, an MTC interference estimation module 805, and an MTC interference comparison module 810.

The target device selection module 705-a, target resource SINR estimation module 710-a, and target SINR comparison module 715-a may be configured to provide the same functionality as the target device selection module 705, target resource SINR estimation module 710, and target SINR comparison module 715 as described above in reference to FIG. 7. For the sake of brevity, these modules will not be individually described again here.

The MTC interference estimation module 805 may further aid in selecting one or more RBs of a target device 120 for uplink transmission while reducing the negative impact this may have on existing communications of the target device 120. For example, device 115-h may transmit on the same selected RB for more than one period. In this case, after transmitting on the RB for at least one period, the MTC interference estimation module 805 may estimate interference caused by the transmissions of device 115-h on existing communications of the target device 120, for example on one or more RBs of the target device 120. The MTC interference estimation module 805 may then communicate the estimate interference, which may be represented by SINR, for the measured RBs of the target device 120 to the MTC interference comparison module 810.

The MTC interference comparison module 810 may then compare the estimated interference metric(s) for each of the RBs of the target device 120 to an interference threshold. In some cases, the interference threshold, which may be represented by a second SINR threshold value, may be determined by the network, MTC server 210, device 115-h, or it may be preset, for example. The resulting information may then be compiled by the MTC interference comparison module 810 and communicated to the target resource block selection module 720-a.

The target resource block selection module 720-a may select the candidate RBs with a SINR less than the SINR threshold based on information received from the target resource SINR estimation module 710-a. The target resource block selection module 720-a may also select the candidate RBs based on information received from the MTC interference comparison module 810. More particularly, the target resource block selection module 720-a may either keep the previously selected RB in the resource pool, such that device 115-h may transmit on the selected RB in the next period, or may remove the selected RB from the resource pool if it causes too much interference on other target device 120 communications. In this way, RB selection for device 115-h may minimize impacts to existing communications of the target device 120.

Figure 9:
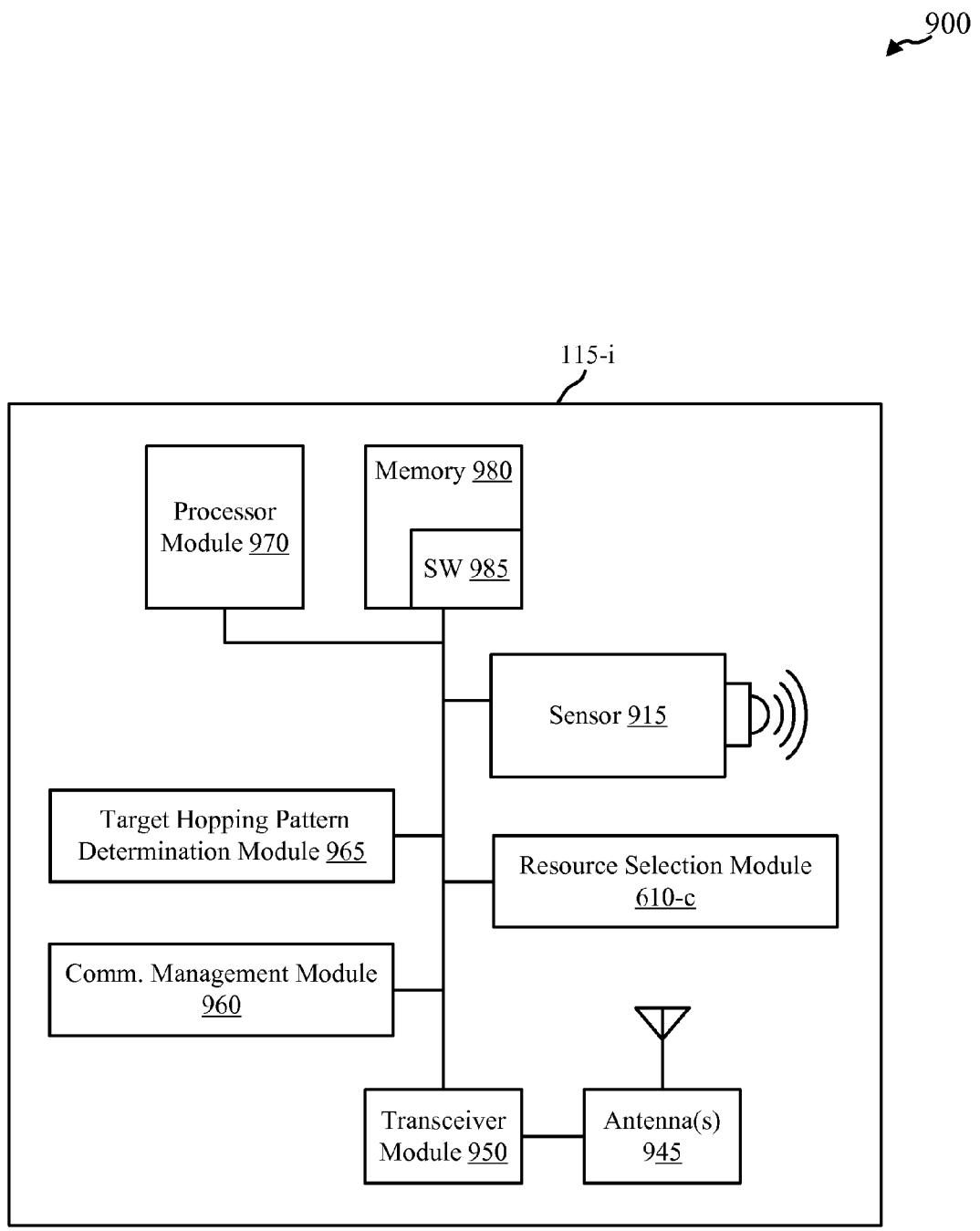
FIG. 9 shows a block diagram of an MTC device that may be configured for utilizing resources of a target device for uplink communication in accordance with various embodiments.

FIG. 9 is a block diagram 900 of an MTC device 115-i configured for utilizing one or more RB of a target device 120, such as a UE or mobile device, for uplink communication with another device, such as a base station 105, in accordance with various embodiments. The MTC device 115-i may have any of various configurations, such as a sensor or monitor 915 for various MTC applications discussed above. The MTC device 115-i may have an internal power supply (not shown), such as a small battery, to facilitate mobile operation. In some embodiments, the MTC device 115-i may be an example of and/or incorporate one or more aspects of the MTC device 115, FIGS. 1, 2, 3, 4, 5, 6, 7, and/or 8. The MTC device 115-i may be a multi-mode mobile device. The MTC device 115-i may be referred to as an MTC UE or M2M device in some cases.

The MTC device 115-i may include a resource selection module 610-c, a target hopping pattern determination module 965, antenna(s) 945, a transceiver module 950, memory 980, and a processor module 970, which each may be in communication, directly or indirectly, with each other (e.g., via one or more buses). The transceiver module 950 may be configured to communicate bi-directionally, via the antenna(s) 945 and/or one or more wired or wireless links, with one or more networks, as described above. For example, the transceiver module 950 may be configured to communicate bi-directionally with base stations 105 of FIGS. 1, 2, 3, and/or 4. The transceiver module 950 may include a modem configured to modulate the packets and provide the modulated packets to the antenna(s) 945 for transmission, and to demodulate packets received from the antenna(s) 945. While the MTC device 115-i may include a single antenna 945, the MTC device 115-i may include multiple antennas 945 for multiple transmission links.

The memory 980 may include random access memory (RAM) and read-only memory (ROM). The memory 980 may store computer-readable, computer-executable software code 985 containing instructions that are configured to, when executed, cause the processor module 970 to perform various functions described herein (e.g., data capture, database management, message routing, etc.). Alternatively, the software code 985 may not be directly executable by the processor module 970 but be configured to cause the computer (e.g., when compiled and executed) to perform functions described herein.

The processor module 970 may include an intelligent hardware device, e.g., a central processing unit (CPU) such as an ARM® based processor or those made by Intel® Corporation or AMD®, a microcontroller, an application-specific integrated circuit (ASIC), etc.

According to the architecture of FIG. 9, the MTC device 115-i may further include a communications management module 960. The communications management module 960 may manage communications with base stations 105, other MTC devices 115, and or target devices 120. By way of example, the communications management module 960 may be a component of the MTC device 115-i in communication with some or all of the other components of the MTC device 115-i via a bus. Alternatively, functionality of the communications management module 960 may be implemented as a component of the transceiver module 950, as a computer program product, and/or as one or more controller elements of the processor module 970.

The components for MTC device 115-i may be configured to implement aspects discussed above with respect to devices 115 of FIGS. 6, 7, and/or 8 and may not be repeated here for the sake of brevity. For example, the resource selection module 610-c may include similar functionality as the resource selection module 610, 610-a, 610-b of FIGS. 6, 7, and/or 8. The target hopping pattern determination module 965 may determine a hopping pattern of a target device 120 via the techniques described above in reference to FIGS. 4 and/or 5.

In some embodiments, the transceiver module 950 in conjunction with antenna(s) 945, along with other possible components of MTC device 115-*i*, may receive transmissions from one or more target devices 120 and may transmit uplink data from the MTC device 115-*i* to base stations 105 or a core network 140 utilizing resources of the one or more target devices. In some embodiments, the transceiver module 950, in conjunction with antennas 945 along with other possible components of MTC device 115-*i*, may receive transmissions from one or more target devices 120 and may transmit uplink data from the MTC device 115-*i* to base stations 105 or a core network 140 such that these devices or systems may utilize flexible waveforms.

In some embodiments, the MTC device 115-*k* may not have a power amplifier. In other cases, the MTC device 115-*k* may have a limited power amplifier compared to a standard UE power amplifier capable of 20 dB, for example a 1-3 dB power amplifier (not shown). In either case, the communication range of the MTC device 115-*k* may be limited. For this and other reasons, the ability of the MTC device 115-*k* to communicate uplink information, for example to a base station 105 or MTC server 210, may be limited. As a result, the techniques described above for relaying communications from the MTC device 115-*k* through a relay device 120 over a narrow frequency band to base station 105 over a broad frequency band may improve uplink communications for the MTC device 115-*k*.

Figure 10:
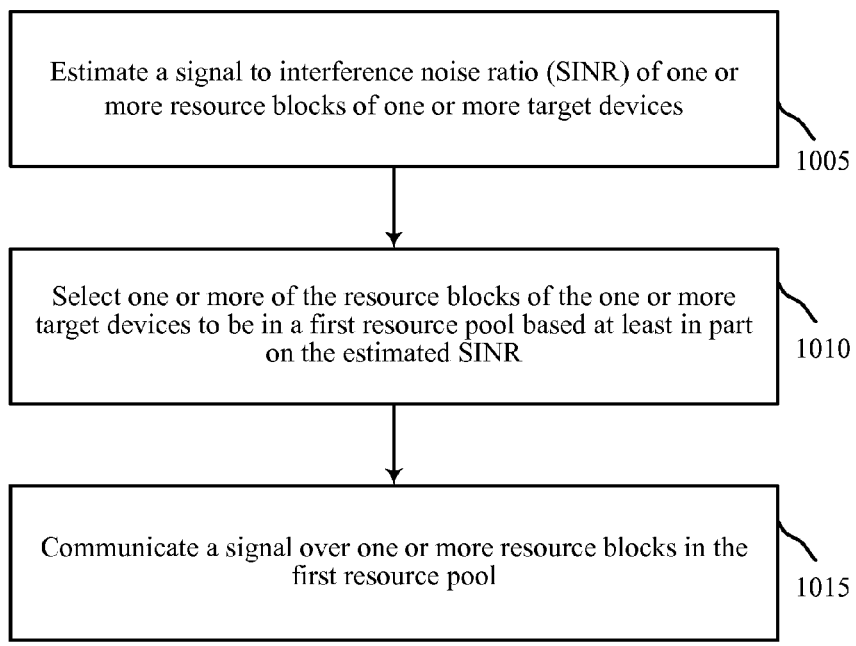
FIGS. 10-13 illustrate flowcharts of methods for utilizing resources of another device for uplink communications in accordance with various embodiments.

FIG. 10 is a flow chart illustrating one example of a method 1000 for utilizing resources of a first device, such as a target device 120, for uplink communication with a second device, such as a base station 105, in accordance with various embodiments. For clarity, the method 1000 is described below with reference to one or more aspects of one of the devices 115 (e.g., an MTC device) described with reference to FIGS. 1, 2, 3, 4, 6, 7, 8, and/or 9. In some embodiments, a device such as one of the devices 115, may execute one or more sets of codes to control the functional elements of the device 115 to perform the functions described below.

At block 1005, a signal to interference noise ratio (SINR) of one or more RBs of one or more target devices may be estimated. The operation(s) at block 1005 may in some cases be performed using the resource selection module 610 described with reference to FIGS. 6, 7, 8, and/or 9, and/or the target resource SINR estimation module 710 described with reference to FIGS. 7 and/or 8.

At block 1010, one or more of the RBs of the one or more target devices may be selected to be in a first resource pool based at least in part on the estimated SINR of the one or more RBs of the one or more target devices. The operation(s) at block 1010 may in some cases be performed using the resource selection module 610 described with reference to FIGS. 6, 7, 8, and/or 9, and/or the target resource block selection module 720 described with reference to FIGS. 7 and/or 8.

At block 1015, a signal may be communicated over one or more RBs in the first resource pool. The operation(s) at block 1015 may in some cases be performed using the resource selection module 610 described with reference to FIGS. 6, 7, 8, and/or 9, the target resource block selection module 720 described with reference to FIGS. 7 and/or 8, the transmitter 615 described with reference to FIG. 6, and/or the transceiver module 950 and/or antennas 945 described in reference to FIG. 9.

Thus, the method 1000 may provide for utilizing resources of a first device for uplink communication with a second device. It should be noted that the method 1000 is just one implementation and that the operations of the method 1000 may be rearranged or otherwise modified such that other implementations are possible.

Figure 11:
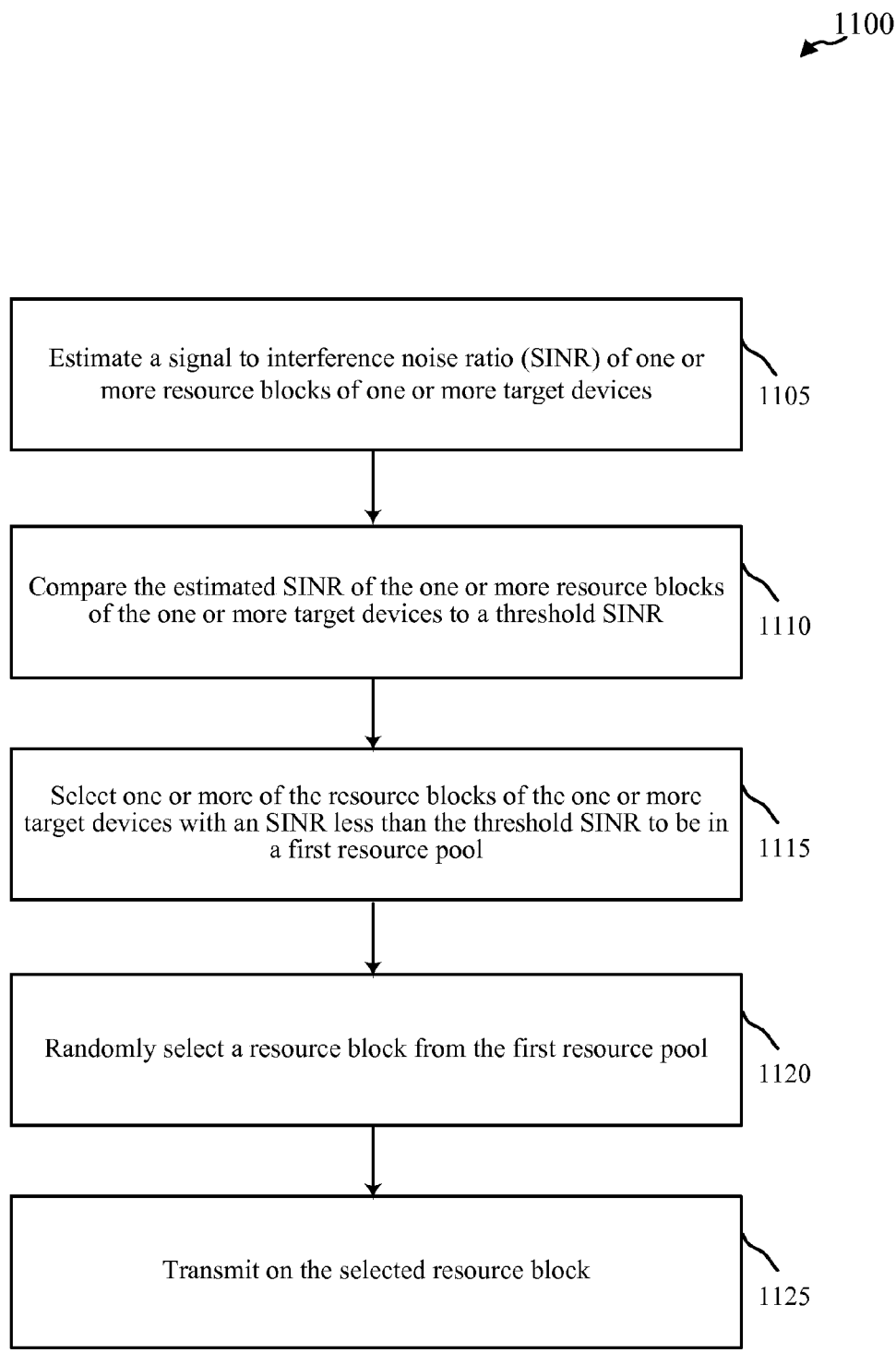

FIG. 11 is a flow chart illustrating one example of a method 1100 for utilizing resources of a first device, such as a target device 120, for uplink communication with a second device, such as a base station 105, in accordance with various embodiments. For clarity, the method 1100 is described below with reference to one or more aspects of one of the devices 115 (e.g., an MTC device) described with reference to FIGS. 1, 2, 3, 4, 6, 7, 8, and/or 9. In some embodiments, a device such as one of the devices 115 may execute one or more sets of codes to control the functional elements of the device 115 to perform the functions described below.

At block 1105, a signal to interference noise ratio (SINR) of one or more RBs of one or more target devices may be estimated. The operation(s) at block 1105 may in some cases be performed using the resource selection module 610 described with reference to FIGS. 6, 7, 8, and/or 9, and/or the target resource SINR estimation module 710 described with reference to FIGS. 7 and/or 8.

At block 1110, the estimated SINR of the one or more RBs of the one or more target devices may be compared to a threshold SINR. The operation(s) at block 1110 may in some cases be performed using the resource selection module 610 described with reference to FIGS. 6, 7, 8, and/or 9, and/or the target SINR comparison module 715 described with reference to FIGS. 7 and/or 8.

At block 1115, one or more of the RBs of the one or more target devices may be selected to be in a first resource pool based at least in part on the estimated SINR of the one or more RBs of the one or more target devices. The operation(s) at block 1115 may in some cases be performed using the resource selection module 610 described with reference to FIGS. 6, 7, 8, and/or 9, and/or the target resource block selection module 720 described with reference to FIGS. 7 and/or 8.

At block 1120, a RB from the first resource pool may be randomly selected. The operation(s) at block 1120 may in some cases be performed using the resource selection module 610 described with reference to FIGS. 6, 7, 8, and/or 9, and/or the target resource block selection module 720 described with reference to FIGS. 7 and/or 8.

At block 1125, transmission on the selected RB may occur. The operation(s) at block 1125 may in some cases be performed using the resource selection module 610 described with reference to FIGS. 6, 7, 8, and/or 9, the target resource block selection module 720 described with reference to FIGS. 7 and/or 8, the transmitter 615 described with reference to FIG. 6, and/or the transceiver module 950 described in reference to FIG. 9.

Thus, the method 1100 may provide for utilizing resources of a first device for uplink communication with a second device. It should be noted that the method 1100 is just one implementation and that the operations of the method 1100 may be rearranged or otherwise modified such that other implementations are possible.

Figure 12:
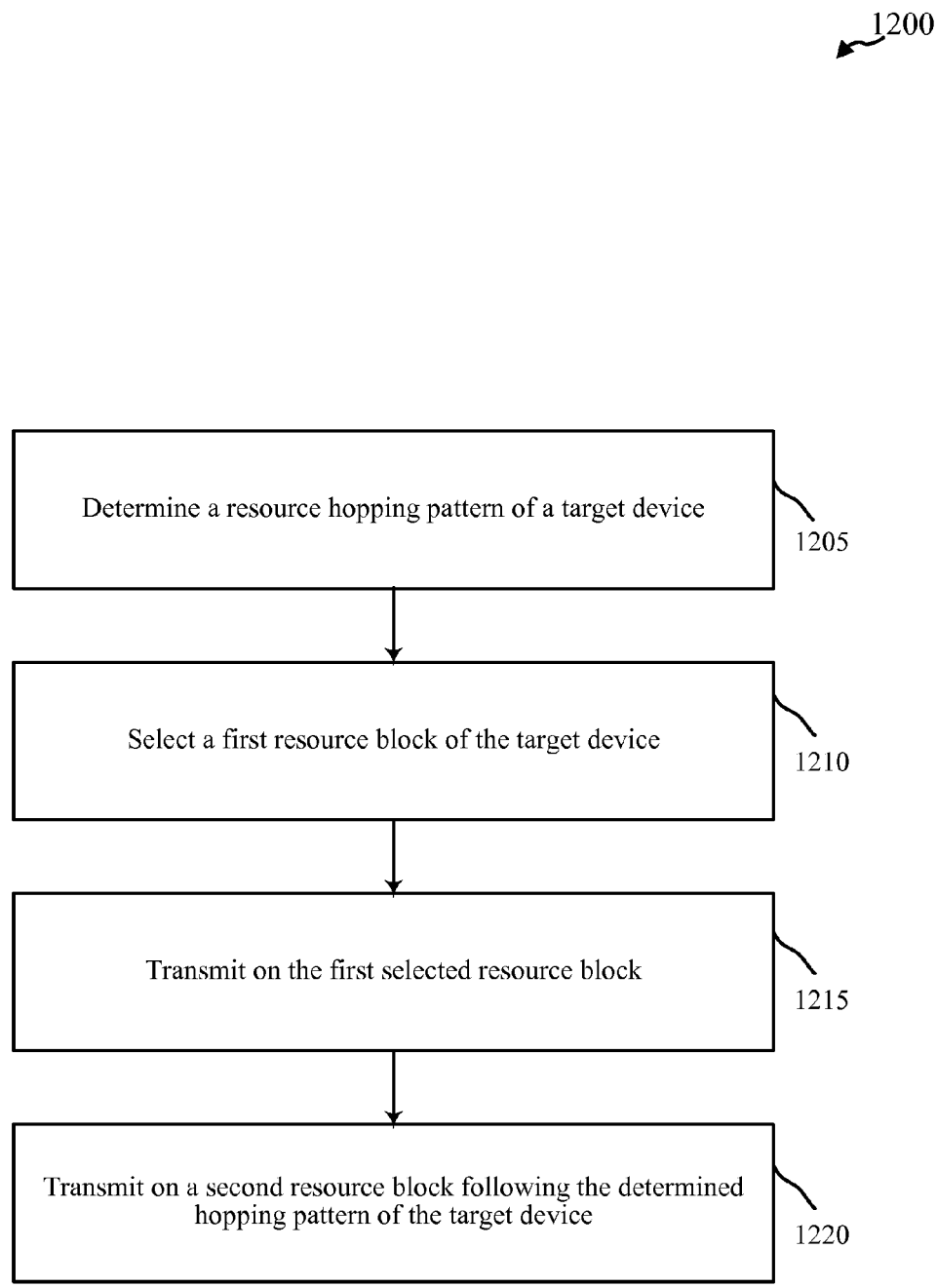

FIG. 12 is a flow chart illustrating one example of a method 1200 for utilizing resources of a first device, such as a target device 120, for uplink communication with a second device, such as a base station 105, in accordance with various embodiments. For clarity, the method 1200 is described below with reference to one or more aspects of one of the devices 115 (e.g., an MTC device) described with reference to FIGS. 1, 2, 3, 4, 6, 7, 8, and/or 9. In some embodiments, a device such as one of the devices 115 may execute one or more sets of codes to control the functional elements of the device 115 to perform the functions described below.

At block 1205, a resource hopping pattern of a target device may be determined. The operation(s) at block 1205 may in some cases be performed using the resource selection module 610 described with reference to FIGS. 6, 7, 8, and/or 9, and/or the target hopping pattern determination module 965 described with reference to FIG. 9.

At block 1210, one or more of the RBs of the target device may be selected, for example, based at least in part on the estimated SINR of the one or more RBs of the target device as described above in reference to FIGS. 10 and/or 11. The operation(s) at block 1210 may in some cases be performed using the resource selection module 610 described with reference to FIGS. 6, 7, 8, and/or 9, and/or the target resource block selection module 720 described with reference to FIGS. 7 and/or 8.

At block 1215, transmission on the selected RB may occur. The operation(s) at block 1215 may in some cases be performed using the resource selection module 610 described with reference to FIGS. 6, 7, 8, and/or 9, the target resource block selection module 720 described with reference to FIGS. 7 and/or 8, the transmitter 615 described with reference to FIG. 6, and/or the transceiver module 950 described in reference to FIG. 9.

At block 1220, transmission on a second selected RB following the determined hopping pattern of the target device may occur. The operation(s) at block 1220 may in some cases be performed using the resource selection module 610 described with reference to FIGS. 6, 7, 8, and/or 9, the target resource block selection module 720 described with reference to FIGS. 7 and/or 8, the target hopping pattern determination module 965 described with reference to FIG. 9, the transmitter 615 described with reference to FIG. 6, and/or the transceiver module 950 described in reference to FIG. 9.

Thus, the method 1200 may provide for utilizing resources of a first device for uplink communication with a second device. It should be noted that the method 1200 is just one implementation and that the operations of the method 1200 may be rearranged or otherwise modified such that other implementations are possible.

Figure 13:
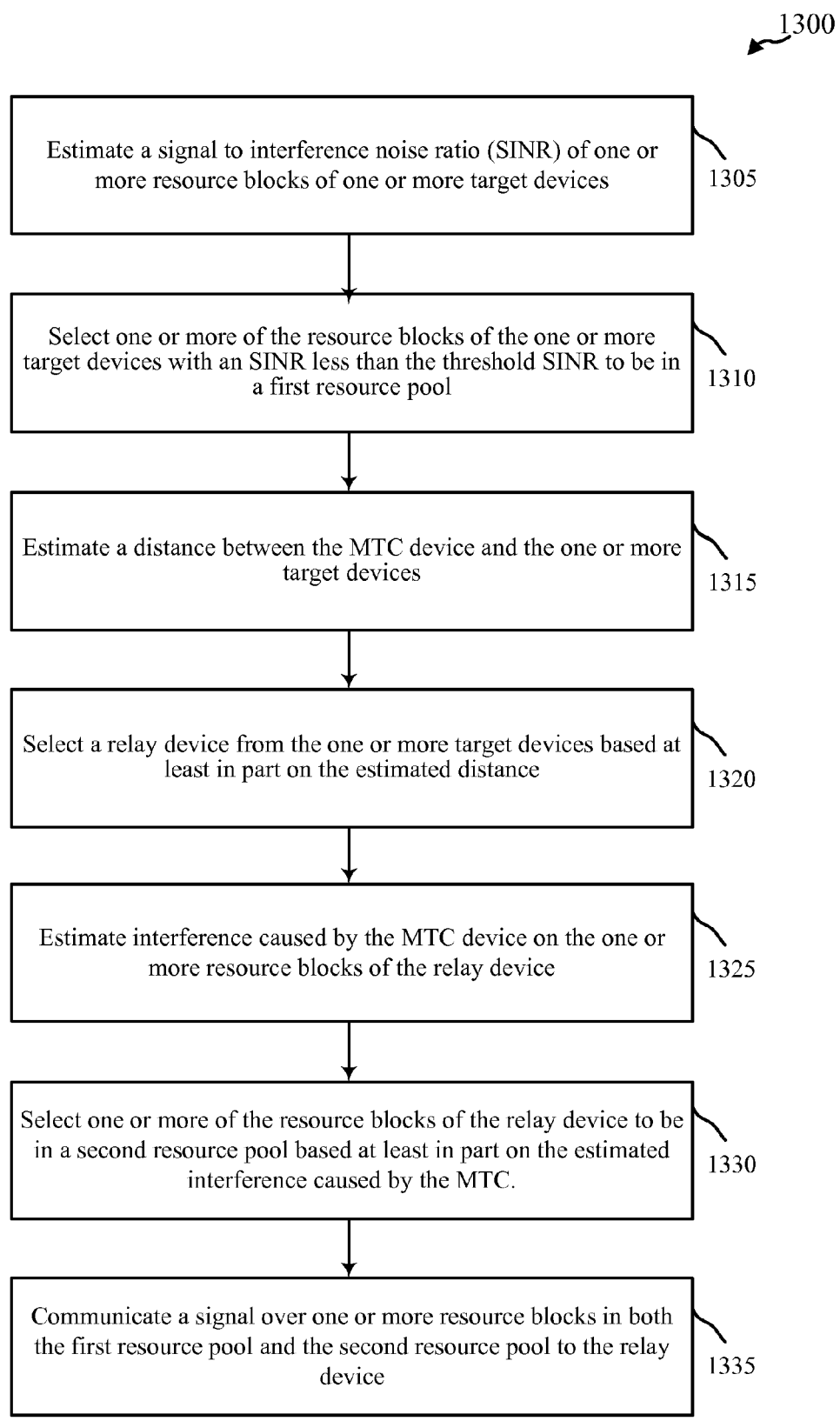

FIG. 13 is a flow chart illustrating one example of a method 1300 for utilizing resources of a first device, such as a target device 120, for uplink communication with a second device, such as a base station 105, in accordance with various embodiments. For clarity, the method 1300 is described below with reference to one or more aspects of one of the devices 115 (e.g., an MTC device) described with reference to FIGS. 1, 2, 3, 4, 6, 7, 8, and/or 9. In some embodiments, a device such as one of the devices 115 may execute one or more sets of codes to control the functional elements of the device 115 to perform the functions described below.

At block 1305, a signal to interference noise ratio (SINR) of one or more RBs of one or more target devices may be estimated. The operation(s) at block 1305 may in some cases be performed using the resource selection module 610 described with reference to FIGS. 6, 7, 8, and/or 9, and/or the target resource SINR estimation module 710 described with reference to FIGS. 7 and/or 8.

At block 1310, one or more of the RBs of the one or more target devices may be selected to be in a first resource pool based at least in part on the estimated SINR(s). The operation(s) at block 1310 may in some cases be performed using the resource selection module 610 described with reference to FIGS. 6, 7, 8, and/or 9, and/or the target resource block selection module 720 described with reference to FIGS. 7 and/or 8.

At block 1315, a distance between the MTC device and the one or more target devices may be estimated. The operation(s) at block 1315 may in some cases be performed using the resource selection module 610 described with reference to FIGS. 6, 7, 8, and/or 9, and/or the target device selection module 705 described with reference to FIGS. 7 and/or 8.

At block 1320, a relay device may be selected from the one or more target devices based at least in part on the estimated distance between the MTC device and the one or more target devices. The operation(s) at block 1320 may in some cases be performed using the resource selection module 610 described with reference to FIGS. 6, 7, 8, and/or 9, and/or the target device selection module 705 described with reference to FIGS. 7 and/or 8.

At block 1325, interference caused by the MTC device on the one or more resource blocks of the relay device may be estimated. The operation(s) at block 1325 may in some cases be performed using the resource selection module 610 described with reference to FIGS. 6, 7, 8, and/or 9, and/or the MTC interference estimation module 805 described with reference to FIG. 8.

At block 1330, one or more of the resource blocks of the relay device may be selected to be in a second resource pool based at least in part on the estimated interference caused by the MTC. The operation(s) at block 1330 may in some cases be performed using the resource selection module 610 described with reference to FIGS. 6, 7, 8, and/or 9, and/or the MTC interference comparison module 810 described with reference to FIG. 8.

At block 1335, the MTC device may communicate a signal over one or more resource blocks in both the first resource pool and the second resource pool to the relay device. The operation(s) at block 1335 may in some cases be performed using the resource selection module 610 described with reference to FIGS. 6, 7, 8, and/or 9, the target resource block selection module 720, and/or the transmitter 615 described with reference to FIG. 6, and/or the transceiver module 950 described in reference to FIG. 9.

Thus, the method 1300 may provide for utilizing resources of a first device for uplink communication with a second device. It should be noted that the method 1300 is just one implementation and that the operations of the method 1300 may be rearranged or otherwise modified such that other implementations are possible.

One or more aspects of the method 1000, 1100, 1200, and/or 1300 may in some cases be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method of communication comprising:
estimating, by a machine type communications (MTC) device, a signal to interference noise ratio (SINR) of a first set of resource blocks of one or more target devices;
selecting, by the MTC device, one or more of the first set of resource blocks of the one or more target devices based at least in part on the estimated SINR;
allocating, by the MTC device, the selected one or more of the first set of resource blocks to be in a first resource pool;
estimating, by the MTC device, an SINR of the MTC device on a second set of resource blocks of a target device of the one or more target devices;
selecting one or more of the second set of resource blocks of the target device to be in a second resource pool based at least in part on the estimated SINR of the MTC device; and transmitting a signal to the target device over one or more resource blocks common to both the first resource pool and the second resource pool.

2. The method of claim 1, further comprising:
comparing the estimated SINR of the first set of resource blocks of the one or more target devices to a threshold SINR,
wherein the selecting of one or more of the first set of resource blocks of the one or more target devices comprises selecting one or more of the first set of resource blocks with an SINR less than the threshold SINR.

3. The method of claim 1, further comprising:
randomly selecting a resource block common to both the first resource pool and the second resource pool; and
transmitting, by the MTC device, on the randomly selected resource block.

4. The method of claim 3, further comprising:
determining a hopping pattern used by the one or more target devices; and
hopping the selected one or more of the first set of resource blocks based on the determined hopping pattern used by the one or more target devices.

5. The method of claim 1, further comprising:
estimating a distance between the MTC device and the one or more target devices; and
selecting a relay device from the one or more target devices based at least in part on the estimated distance, wherein the target device is the relay device.

6. The method of claim 5, further comprising:
measuring a signal strength of the first set of resource blocks of the one or more target devices; and
wherein estimating the distance between the MTC device and the one or more target devices is based at least in part on the measured signal strength.

7. The method of claim 1, further comprising:
comparing the SINR of the MTC device on the second set of resource blocks of the target device to a threshold; and
wherein the selecting of one or more of the of the second set of resource blocks of the target device to be in the second resource pool comprises selecting one or more of the second set of resource blocks of the target device with the SINR of the MTC device larger than the threshold.

8. The method of claim 1, wherein the one or more target devices is a user equipment (UE) engaged in autonomous discovery.

9. The method of claim 1, wherein the second set of resource blocks comprises a subset of the selected one or more of the first set of resource blocks.

10. A machine type communications (MTC) device, comprising:
a processor;
memory in electronic communication with the processor; and
instructions stored in the memory, the instructions being executable by the processor to:
estimate a signal to interference noise ratio (SINR) of a first set of resource blocks of one or more target devices;
select one or more of the resource blocks of the first set of one or more target devices based at least in part on the estimated SINR;
allocate the selected one or more of the first set of resource blocks to be in a first resource pool;

estimate, by the MTC device, an SINR of the MTC device on a second set of resource blocks of a target device of the one or more target devices;
select one or more of the second set of resource blocks of the target device to be in a second resource pool based at least in part on the estimated SINR of the MTC device; and
transmit a signal to the target device over one or more resource blocks common to both the first resource pool and the second resource pool.

11. The MTC device of claim 10, wherein the instructions are executable by the processor to:
compare the estimated SINR of the first set of resource blocks of the one or more target devices to a threshold SINR,
wherein the instructions executable by the processor to select one or more of the first set of resource blocks of the one or more target devices comprise instructions executable by the processor to select one or more of the first set of resource blocks with an SINR less than the threshold SINR.

12. The MTC device of claim 10, wherein the instructions are executable by the processor to:
randomly select a resource block common to both the first resource pool and the second resource pool; and
transmit on the randomly selected resource block.

13. The MTC device of claim 12, wherein the instructions are executable by the processor to:
determine a hopping pattern used by the one or more target devices; and
hop the selected one or more of the first set of resource blocks based on the determined hopping pattern used by the one or more target devices.

14. The MTC device of claim 10, wherein the instructions are executable by the processor to:
estimate a distance between the MTC device and one or more target devices; and
select a relay device from the one or more target devices based at least in part on the estimated distance, wherein the target device is the relay device.

15. The MTC device of claim 14, wherein the instructions are executable by the processor to:
measure a signal strength of the first set of resource blocks of the one or more target devices; and
wherein estimating the distance between the MTC device and the one or more target devices is based at least in part on the measured signal strength.

16. The MTC device of claim 10, wherein the one or more target devices is a user equipment (UE) engaged in autonomous discovery.

17. The MTC device of claim 10, wherein the second set of resource blocks comprises a subset of the first set of resource blocks.

18. A machine type communications (MTC) device comprising:
means for estimating a signal to interference noise ratio (SINR) of a first set of resource blocks of one or more target devices;
means for selecting one or more of the first set of resource blocks of the one or more target devices based at least in part on the estimated SINR;
means for allocating the selected one or more of the first set of resource blocks to be in a first resource pool;
means for estimating, by the MTC device, an SINR of the MTC device on a second set of resource blocks of a target device of the one or more target devices;

means for selecting one or more of the second set of resource blocks of the target device to be in a second resource pool based at least in part on the estimated SINR of the MTC device; and means for transmitting a signal to the target device over one or more resource blocks common to both the first resource pool and the second resource pool.

19. The MTC device of claim 18, further comprising:

means for comparing the estimated SINR of the first set of resource blocks of the one or more target devices to a threshold SINR, wherein the means for selecting one or more of the first set of resource blocks of the one or more target devices comprises means for selecting one or more of the first set of resource blocks with an SINR less than the threshold SINR.

20. The MTC device of claim 18, further comprising:

means for randomly selecting a resource block common to both the first resource pool and the second resource pool; and means for transmitting on the randomly selected resource block.

21. The MTC device of claim 20, further comprising:

means for determining a hopping pattern used by the one or more target devices; and means for hopping the selected one or more of the first set of resource blocks based on the determined hopping pattern used by the one or more target devices.

22. The MTC device of claim 18, further comprising:

means for estimating a distance between the MTC device and the one or more target devices; and means for selecting a relay device from the one or more target devices based at least in part on the estimated distance, wherein the target device is the relay device.

23. The MTC device of claim 18, wherein the one or more target devices is a user equipment (UE) engaged in autonomous discovery.

24. The MTC device of claim 18, wherein the second set of resource blocks comprises a subset of the first set of resource blocks.

25. A computer program product operable on a machine type communications (MTC) device, the computer program product comprising a non-transitory computer-readable medium storing instructions executable by a processor to:

estimate a signal to interference noise ratio (SINR) of a first set of resource blocks of one or more target devices;

select one or more of the first set of resource blocks of the one or more target devices based at least in part on the estimated SINR;

allocate the selected one or more of the first set of resource blocks to be in a first resource pool;

estimate, by the MTC device, an SINR of the MTC device on a second set of resource blocks of a target device of the one or more target devices;

select one or more of the second set of resource blocks of the target device to be in a second resource pool based at least in part on the estimated SINR of the MTC device; and transmit a signal to the target device over one or more resource blocks common to both the first resource pool and the second resource pool.

26. The computer program product of claim 25, wherein the instructions are executable by the processor to:

randomly select a resource block common to both the first resource pool and the second resource pool; and transmit on the randomly selected resource block.

27. The computer program product of claim 26, wherein the instructions are executable by the processor to:

determine a hopping pattern used by the one or more target devices; and hop the selected one or more of the first set of resource blocks based on the determined hopping pattern used by the one or more target devices.

28. The computer program product of claim 25, wherein the second set of resource blocks comprises a subset of the first set of resource blocks.

* * * * *